(12) United States Patent
Cohen et al.

(10) Patent No.: US 9,348,725 B1
(45) Date of Patent: *May 24, 2016

(54) METHOD AND SYSTEM FOR HANDLING FAILED TEST SCENARIOS

(75) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Hod Hasharon (IL)

( * ) Notice: Subject to any disclaimer, the term of this patent is extended or adjusted under 35 U.S.C. 154(b) by 286 days.

This patent is subject to a terminal disclaimer.

(21) Appl. No.: 13/103,081

(22) Filed: May 8, 2011

Related U.S. Application Data

(60) Provisional application No. 61/375,858, filed on Aug. 22, 2010.

(51) Int. Cl.
*G06F 9/45* (2006.01)
*G06F 11/36* (2006.01)
*G06F 9/445* (2006.01)

(52) U.S. Cl.
CPC ........ *G06F 11/3604* (2013.01); *G06F 9/44589* (2013.01)

(58) Field of Classification Search
None
See application file for complete search history.

(56) References Cited

U.S. PATENT DOCUMENTS

| | | | |
|---|---|---|---|
| 5,548,718 A | 8/1996 | Siegel et al. | |
| 5,781,720 A * | 7/1998 | Parker et al. | 714/38.11 |
| 5,905,856 A * | 5/1999 | Ottensooser | 714/38.1 |
| 6,360,332 B1 | 3/2002 | Weinberg et al. | |
| 7,191,435 B2 * | 3/2007 | Lau et al. | 717/168 |
| 7,478,365 B2 | 1/2009 | West et al. | |
| 7,490,319 B2 | 2/2009 | Blackwell et al. | |
| 8,117,591 B1 * | 2/2012 | Michelsen | G06F 8/34 717/109 |
| 8,205,191 B1 * | 6/2012 | Kolawa et al. | 717/124 |
| 8,578,336 B1 * | 11/2013 | Wiradarma et al. | 717/125 |
| 2005/0071818 A1 * | 3/2005 | Reissman et al. | 717/127 |
| 2005/0257086 A1 * | 11/2005 | Triou et al. | 714/25 |
| 2006/0129994 A1 * | 6/2006 | Srivastava et al. | 717/124 |
| 2006/0168565 A1 * | 7/2006 | Gamma et al. | 717/122 |
| 2007/0043980 A1 | 2/2007 | Ohashi et al. | |
| 2007/0089091 A1 | 4/2007 | Larab et al. | |
| 2007/0220341 A1 | 9/2007 | Apostoloiu et al. | |
| 2007/0255579 A1 | 11/2007 | Boland et al. | |
| 2008/0010537 A1 * | 1/2008 | Hayutin et al. | 714/38 |
| 2008/0016499 A1 | 1/2008 | Jones et al. | |
| 2008/0086348 A1 | 4/2008 | Rao et al. | |
| 2008/0086499 A1 | 4/2008 | Wefers et al. | |
| 2008/0086660 A1 | 4/2008 | Wefers | |
| 2008/0098361 A1 * | 4/2008 | Kumar et al. | 717/128 |
| 2008/0127095 A1 | 5/2008 | Brennan et al. | |
| 2008/0222606 A1 * | 9/2008 | Solirov et al. | 717/122 |

(Continued)

OTHER PUBLICATIONS

Amitabh Srivastava, Effectively Prioritizing Tests in Development Environment, ISSTA 2002.
Sunghun Kim, Michael D. Ernst, Which Warnings Should I Fix First, Sep. 2007, ESEC-FSE'07, Croatia.
Greg Little, Koala: Capture, Share, Automate, Personalize Business Processes on the Web, 2007, Proc. CHI '07.

(Continued)

*Primary Examiner* — Isaac T Tecklu
(74) *Attorney, Agent, or Firm* — Active Knowledge Ltd.

(57) ABSTRACT

Processing failures of executing test scenarios over a data-oriented large-scale software system, including: identifying failures of the test scenarios due to logical errors in the failed test scenarios; forwarding the identified logical related failed test scenarios to a non-programmer user for re-recording or manual evaluation; identifying failures of the test scenarios due to code errors; and forwarding the identified code related failed test scenarios to a programmer for code change.

18 Claims, 22 Drawing Sheets

(56) References Cited

U.S. PATENT DOCUMENTS

| | | | | |
|---|---|---|---|---|
| 2008/0228805 | A1* | 9/2008 | Bruck et al. | 707/102 |
| 2008/0270933 | A1* | 10/2008 | Straw et al. | 715/781 |
| 2009/0138855 | A1* | 5/2009 | Huene et al. | 717/125 |
| 2009/0187894 | A1* | 7/2009 | Bell et al. | 717/127 |
| 2009/0307650 | A1* | 12/2009 | Saraf et al. | 717/101 |
| 2009/0313606 | A1* | 12/2009 | Geppert et al. | 717/124 |
| 2010/0100872 | A1* | 4/2010 | Mitra | 717/125 |
| 2010/0312592 | A1* | 12/2010 | Sallakonda et al. | 705/7 |
| 2011/0145788 | A1* | 6/2011 | Xu et al. | 717/121 |

OTHER PUBLICATIONS

Worksoft, Inc., Accelerating SAP: innovation in test automation, 2007.
Worksoft, Inc., Business Process Validation: What It Is, How to Do It and How to Automate It, 2008.
Renee C. Bryce, Test Suite Prioritization by Interaction Coverage, Sep. 2007, Domain-Specific Approaches to Software Test Automation Workshop Dubrovnik, Croatia.

* cited by examiner

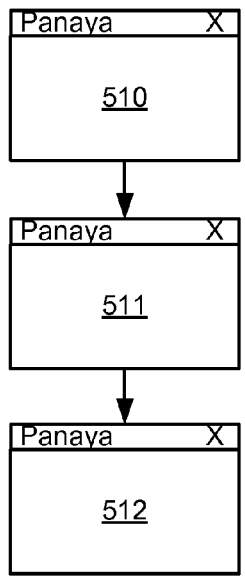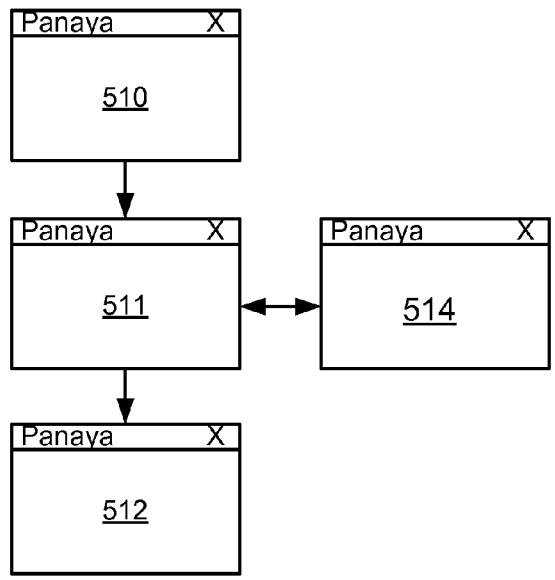
FIG. 5A    FIG. 5B
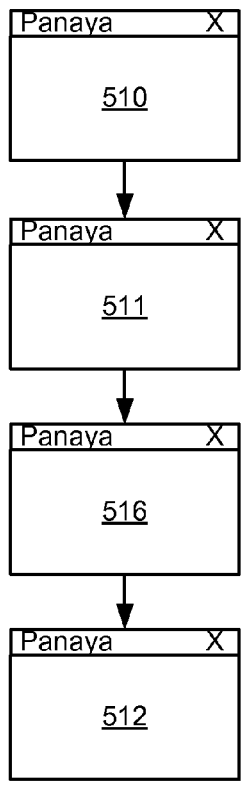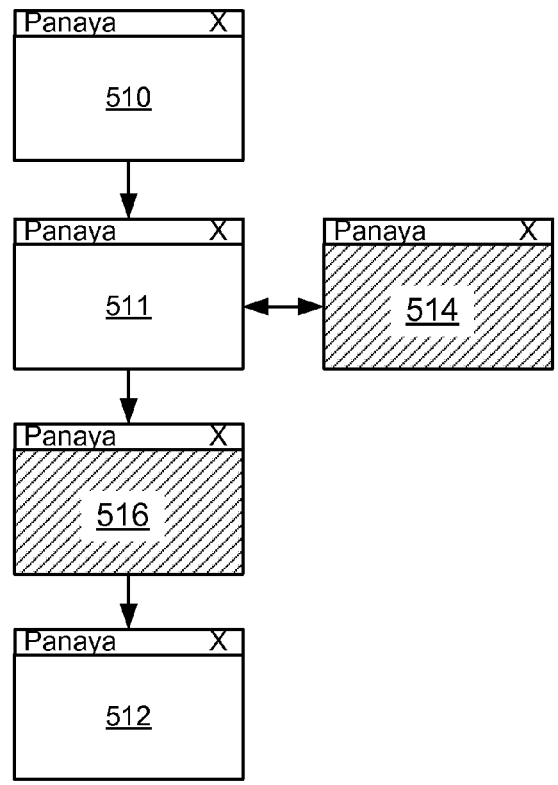
FIG. 5C    FIG. 5D

810

```
┌─────────────────────────────────────────────────┐
│ Panaya                                        X │
├─────────────────────────────────────────────────┤
│ ┌─────────────────────────────────────────────┐▲│
│ │ Fill in product info:                       │ │
│ │ Product code: _____  Product model [55655▽]│ │
│ │                        [ Check Availability ]│ │
│ │                                             │ │
│ │ Fill in customer info:                      │ │
│ │                                             │ │
│ │ Name:      John Smith                       │ │
│ │ Address    NYC                              │ │
│ │ Credit card   _____                       │▼│
│ │                                             │ │
│ │                                    [ NEXT ] │ │
│ └─────────────────────────────────────────────┘ │
└─────────────────────────────────────────────────┘
```

FIG. 8A

```
┌─────────────────────────────────────────────────┐
│ Panaya                                        X │
├─────────────────────────────────────────────────┤
│ Fill in product info:                         ▲ │
│ Product code: _____  Product model [44444▽]   │
│                        [ Check Availability ]   │
│                                                 │
│ Fill in customer info:                          │
│                                                 │
│ Name:      John Smith                           │
│ Address    NYC                                  │
│ Credit card   12345678                        ▼ │
│                                                 │
│                                      [ NEXT ]   │
└─────────────────────────────────────────────────┘
```

FIG. 8B

METHOD AND SYSTEM FOR HANDLING FAILED TEST SCENARIOS

CROSS-REFERENCE TO RELATED APPLICATIONS

This application claims the benefit of U.S. Provisional Patent Application No. 61/375,858, filed Aug. 22, 2010.

The following co-pending U.S. Patent Applications, filed on May 8, 2011, may include related subject matter: Ser. Nos. 13/103,075; 13/103,076; 13/103,078; 13/103,079; 13/103,080; 13/103,082; 13/103,083 (now U.S. Pat. No. 8,522,083); Ser. Nos. 13/103,086; and 13/103,088.

TECHNICAL FIELD

Some of the disclosed embodiments relate to testing of computer software, and more specifically to method and system for handling failed test scenarios.

BACKGROUND

Software testing is a fundamental component of software quality assurance and includes many methodologies and types, such as acceptance testing, black box testing, compatibility testing, functional testing, integration testing, regression testing, system testing, unit testing, and white box testing. It is common for software developers to spend a significant amount of time and effort on generating the tests, and to spend a significant amount of time and effort on maintaining the available tests.

Common testing methodologies, such as manual testing and record and play testing, require the test setup to be almost the same as the original setup, which is an unrealistic requirement in many cases. This is especially noticeable when facing a system upgrade, where all the standard components are upgraded without additional developments or modules. The effect of the system upgrade on the user code is unknown and thus should be tested.

BRIEF SUMMARY

In one embodiment, a computer program product for use in a computer to process failures of executing test scenarios over a data-oriented large-scale software system, the computer including a processor, and the computer program product comprising: program code for identifying failures of the test scenarios due to logical errors in the failed test scenarios; program code for forwarding the identified logical related failed test scenarios to a non-programmer user for re-recording or manual evaluation; program code for identifying failures of the test scenarios due to code errors; and program code for forwarding the identified code related failed test scenarios to a programmer for code change. Optionally, the logical errors result from parametric test scenarios that do not include clear specification of how to handle certain instances of a business process. Optionally, the logical errors result from missing coverage of all variations of a business process. Optionally, the logical errors result from inaccurate description of a business process. Optionally, the embodiment further comprising program code for directing the non-programmer user to re-record a scenario in a way that enables a test recording and analysis component to identify a missing prerequisite for a certain screen. Optionally, the code errors cause abnormal termination, and the abnormal termination does not include normal termination with a value different from expected value. Optionally, the abnormal termination is selected from the group of: internal system errors, activation errors, and compilation errors. Optionally, the computer runs Java programming language and the internal system errors are Java exceptions. Optionally, the computer runs ABAP programming language and the internal system errors are ABAP unexpected errors.

In one embodiment, a computer system to process failures of executing test scenarios over a data-oriented large-scale software system, the computer system comprising: a storage device containing computer usable code; and a processing unit operable to execute the computer usable code to: identify failures of the test scenarios due to logical errors in the failed test scenarios; forward the identified logical related failed test scenarios to a non-programmer user for re-recording or manual evaluation; identify failures of the test scenarios due to code errors; and forward the identified code related failed test scenarios to a programmer for code change. Optionally, the processing unit further executes the computer usable code to direct the non-programmer user to re-record a scenario in a way that enables a test recording and analysis component to identify a missing prerequisite for a certain screen. Optionally, the code errors result in abnormal terminations, and the abnormal terminations do not include normal terminations with values different from expected values. Optionally, the code errors result in abnormal terminations, and the abnormal terminations are selected from the group of: internal system errors, activation errors, and compilation errors. Optionally, the computer runs Java programming language and the internal system errors are Java exceptions. Optionally, the computer runs ABAP programming language and the internal system errors are ABAP unexpected errors.

In one embodiment, a computer implemented method for correcting test scenarios using re-recording, comprising: receiving descriptions of test scenarios that failed while executed by an automatic testing component; wherein at least 50% of the test scenarios are expressed by user interaction activities and not code-related language; identifying the test scenarios that failed due to insufficient description while the code is fine; identifying the test scenarios that failed due to code error; re-recording, by a non-programmer user on a data-oriented large-scale software system, the test scenarios that failed due to insufficient description while the code is fine; and forwarding to a programmer for code change the test scenarios that failed due to code error. Optionally, the step of identifying the test scenarios that failed due to insufficient description is performed by a non-programmer user. Optionally, the step of identifying the test scenarios that failed due to code error is performed by a non-programmer user. Optionally, a non-programmer user identifies test scenarios that failed with an abnormal termination as test scenarios that failed due to code error, wherein abnormal termination does not include normal termination with a value different from an expected value. Optionally, a non-programmer user identifies test scenarios that do not result in predefined expected values as test scenarios that were failed due to insufficient description while the code is fine.

BRIEF DESCRIPTION OF THE DRAWINGS

The embodiments are herein described, by way of example only, with reference to the accompanying drawings. In the drawings:

FIG. 5A, FIG. 5B, and FIG. 5C illustrate three instances of the same scenario, which result in different screen flows;

FIG. 5D illustrates a master scenario including the various identified screens;

FIG. 8A, FIG. 8B, and FIG. 8C illustrate a method for semiautomatic execution of a functioning test scenario to enable a non-programmer user to generate a new test scenario based on the functioning test scenario;

DETAILED DESCRIPTION

Figure 1A:
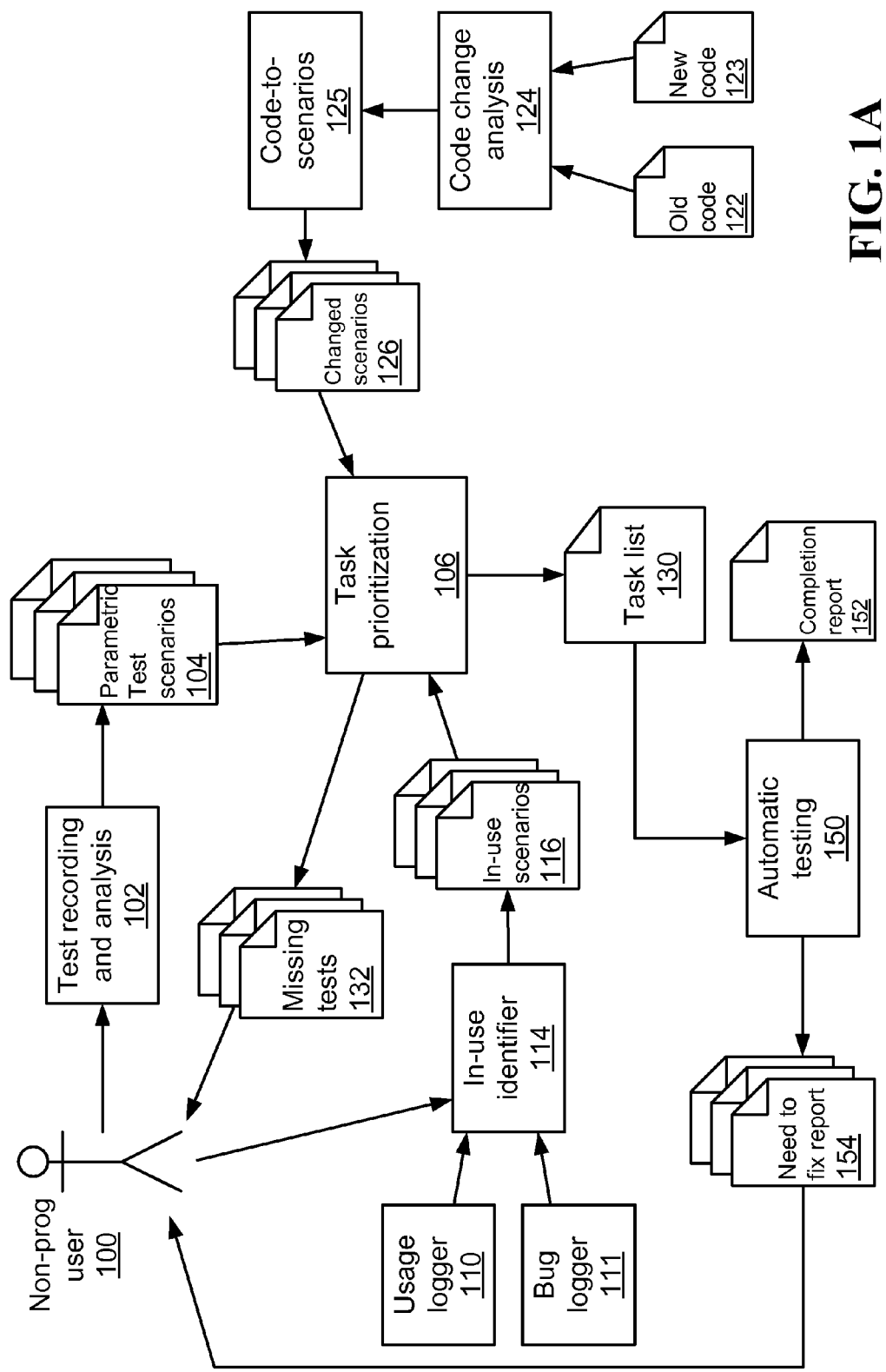
FIG. 1A, FIG. 1B, and FIG. 1C illustrate embodiments of systems for testing a data-oriented large-scale software package.

The term "transaction" is defined as a computer program, such as SAP ERP transaction, or Oracle Application Form.

The term "business process", also known as "workflow", is defined as a set of coordinated tasks and activities, conducted by both people and equipment, which leads to accomplish a specific organizational goal. A business process usually executes two or more transactions; however, in some embodiments a business process may execute only one transaction.

The term "test scenario" is defined as a user-interaction description of functional and/or technical specification for testing a business process and/or one or more transactions. At least 50% of the test scenarios are expressed by user interaction activities and not code-related language, such as procedure calls. A test scenario may specify generally how to test one or more business processes, business requirements, test conditions, logical data, and/or expected results. Additionally or alternatively, a test scenario may detail the exact steps to be followed to complete the testing, such as a sequence of test steps with roles and application used, data used for testing, expected results, and contextual information. Usually, many different test scenarios are needed to test a single business process completely. A scenario executes one or more transactions, and many different scenarios may relate to a single business process.

In some embodiments, the test scenarios are non-executable human-readable test scenarios. It is noted that the non-executable human-readable test scenarios are significantly different from unit tests and test cases, which are executable test descriptions written by programmers.

The term "parametric test scenario repairable by a non-programmer user" is defined as a test scenario pseudocode written with expressions that substantially conform to the user's work environment and therefore is understandable by a non-programmer user.

The term "organization-specific in-use scenarios" or shortly, "in-use scenarios", in relation to a specific organization, is defined as a subset of the scenarios that are actually executed by the specific organization, and therefore are relevant to the specific organization. The term "organization-specific in-use scenarios" is specifically limited to include less than half the total possible scenarios supported by the data-oriented large-scale software system operated by the specific organization. A subset of scenarios that includes more than half the total scenarios supported by the data-oriented large-scale software system of the specific organization is not considered herein as "organization-specific". In some cases, organization-specific in-use scenarios are specifically limited to include less than 10% the total possible scenarios supported by the data-oriented large-scale software system of the specific organization. In some examples, the organization-specific in-use scenarios may be substantially limited to a subset of the actually executed scenarios (i) used by certain users or certain departments of the specific organization, (ii) potentially error-prone scenarios or transactions identified by a failure logger monitoring the specific organization, and/or (iii) manually identified as important to the specific organization, or as important to similar organizations in the same field.

The term "organization-specific in-use software elements" refers to software elements executed by the organization-specific in-use scenarios.

The terms "different installations" or "other installations" or "old and new installations", in relation to certain test scenario(s), are defined as software releases and/or software configurations that cannot exchange plain scenario recordings and still successfully play the exchanged recordings of the certain test scenario without some adaptation.

For example, a first company and a second company are considered to operate different installations of data-oriented large-scale software systems, in relation to a certain test scenario, if a recording of the certain scenario taken on the installation of the first company cannot play successfully on the installation of the second company without some adaptation of the recorded scenario to the specific installation of the second company. Examples of different installations include cases where the companies run (i) exactly the same ERP software releases, with the same customizations, but with different data, (ii) exactly the same ERP software releases, with different customizations, and/or (iii) different ERP software releases.

Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems.

The term "user-generated code" is defined as code written for a data-oriented large-scale software system, which changes the behavior of the data-oriented large-scale software system, and was not generated and usually unsupported by the manufacturer of the data-oriented large-scale system. User-generated code is usually created for a specific organization. User-generated code can be implemented as an independent transaction or as an enhancement to an existing transaction. Examples of user-generated code in ERP include, but are not limited to, adding code to a "user-exit" in SAP environment, changing the original ERP system code, changing the visible/invisible property of a field inside a window, and defining a field as mandatory. It is noted that activities that do not change the system behavior, such as changing user permissions, or data changes such as setting a new catalog number or adding a warehouse, are not considered as user-generated code.

The term "non-programmer user" is defined as a user familiar with the data-oriented large-scale software system. The non-programmer user knows how to operate the system, may be able to draft requirements for new business processes, but does not prepare the actual user-generated code used to customize the data-oriented large-scale software system. Examples of non-programmer users include ERP business analyst, ERP professional, business expert, and/or end-user.

The term "customization" in the context of a data-oriented large-scale software system refers to data describing the business processes, such as SAP Configuration Tables and Oracle Form Personalization. The term "customization change" refers to change to data structures related to the business processes such as changes to SAP Configuration Tables or Oracle Form Personalization.

The term "abnormal termination" includes errors such as an internal system error, an activation error, and/or a compilation error. Abnormal termination does not include normal termination with a value different from an expected value.

FIG. 1A illustrates one embodiment of a system for testing a data-oriented large-scale software package, such as ERP or billing software platforms. A non-programmer user 100 records test scenarios that are converted to parametric test scenarios 104 by a test recording and analysis component 102. The parametric test scenarios 104 describe how to execute the test scenarios and how to evaluate the execution outcomes. Optionally, the execution outcome is evaluated by comparing the results of the executed test scenarios with the results of the recorded scenarios.

In-use identifier component 114.

An in-use identifier component 114 identifies scenarios that are actually in use by the specific organization, referred to as in-use scenarios 116. In some embodiments, the in-use identifier component 114 receives inputs from one or more of the following: a usage logger 110 that registers the used scenarios and/or transactions, a bug logger 111 that registers faults in the used scenarios and/or transactions, and/or from a non-programmer user 100 that identifies the used scenarios and/or transactions. Optionally, the in-use identifier component 114 assigns weights to the various input scenarios according to their importance to the organization, as further discussed below.

In one embodiment, the in-use identifier component 114 identifies transactions, optionally because the usage logger 110 and the bug logger 111 register transactions and the non-programmer user 100 identifies transactions and not scenarios. As a result, the in-use scenarios 116 may include all the scenarios operated by the identified transactions, and therefore may include redundant scenarios. In one embodiment, the in-use identifier component 114 identifies the used procedures, and then the used procedures are mapped to the in-use scenarios 116.

Code change analysis component 124 and code-to-scenario component 125.

The code change analysis component 124 receives as inputs an old code version 122 and a new code version 123, and identifies code that was changed or impacted as a result of replacing the old code version 122 with the new code version 123. In one example, the code change analysis component 124 is based on static impact analysis, and/or text comparison algorithm. In the field of code change analysis, the old code version 122 may also be known as the base code or standard code, which may include user-generated code. The new code version 123 may result, for example, from a software upgrade process, from a direct code change by a programmer (that may be related or unrelated to an upgrade process), and/or from adding/removing/replacing a certain code module. The identified changed code is received by a code-to-scenarios component 125. Code-to-scenarios component 125 identifies the list of changed scenarios 126, which includes business processes that use at least some of the changed code or some of the code affected by the code change.

In some embodiments, the code change analysis component 124 may also be used to identify customization changes by comparing an old customization version with a new customization version. In these embodiments, the code-to-scenarios component 125 operates as a customization-to-scenario component, which identifies the list of changed scenarios 126, which includes business processes that use at least some of the changed customizations.

In one embodiment, the code-to-scenarios component 125 identifies the software elements operated by each business process using a static analysis, such as control flow analysis. Then, the code-to-scenarios component 125 stores the software elements called by each business process in a call graph (also known as a call multigraph), which is a directed graph representing calling relationships between computer program procedures. And then, the call graph is utilized to identify the list of changed scenarios 126. Optionally, the list of changed scenarios 126 is provided to the task prioritization component 106, which may create task list 130 and/or prioritize the results of the code change analysis 124 according to other inputs such as the available parametric test scenarios 104 and/or the in-use scenarios 116.

In another embodiment, the code-to-scenarios component 125 identifies the software elements operated by each business process using a dynamic analysis. The dynamic analysis may operate on a registration of the procedures run by the recorded scenarios. This dynamic analysis may also generate some of the in-use scenarios 116.

In still another embodiment, the code-to-scenarios component 125 includes code-to-transactions and transaction-to-scenarios. This embodiment utilizes an impact analysis module that formulates its results in transactions. Optionally, substantially all the scenarios that utilize the transactions resulted from the impact analysis are presented in changed scenarios 126.

In one embodiment, a method for comparing old and new customizations in order to prioritize recorded parametric test scenarios for maintenance purposes, comprising the following steps: (i) Receiving a manual recording of a test scenario on an old installation of a data-oriented large-scale software system. (ii) Receiving an old customization and a new customization of the data-oriented large-scale software system, wherein the old and new customizations are data structures related to business processes. (iii) Identifying old customization elements that are different from the new customization elements. (iv) Identifying changed customizations that are utilized by the recorded test scenario. And (v) Increasing the priority of fixing the identified changed customizations utilized by the recorded test scenario. Optionally, the customization changes are changes to SAP Configuration Tables or to Oracle Form Personalization.

In one embodiment, a method for prioritizing test plan for customization changes according to in-use scenarios, based on comparing old and new customizations in order to prioritize recorded parametric test scenarios for maintenance purposes, including the following steps: (i) Receiving a manual recording of a test scenario on an old installation of a data-oriented large-scale software system. (ii) Receiving an old customization and a new customization of the data-oriented large-scale software system. Optionally, the old and new customizations are data structures related to business processes. (iii) Identifying old customization elements that are different from the new customization elements. (iv) Identifying changed customizations utilized by the recorded test scenario. And (V) Increasing the priority of fixing the identified changed customizations utilized by the recorded test scenario. Optionally, the customization changes are changes to SAP Configuration Tables and/or to Oracle Form Personalization.

Figure 1B:
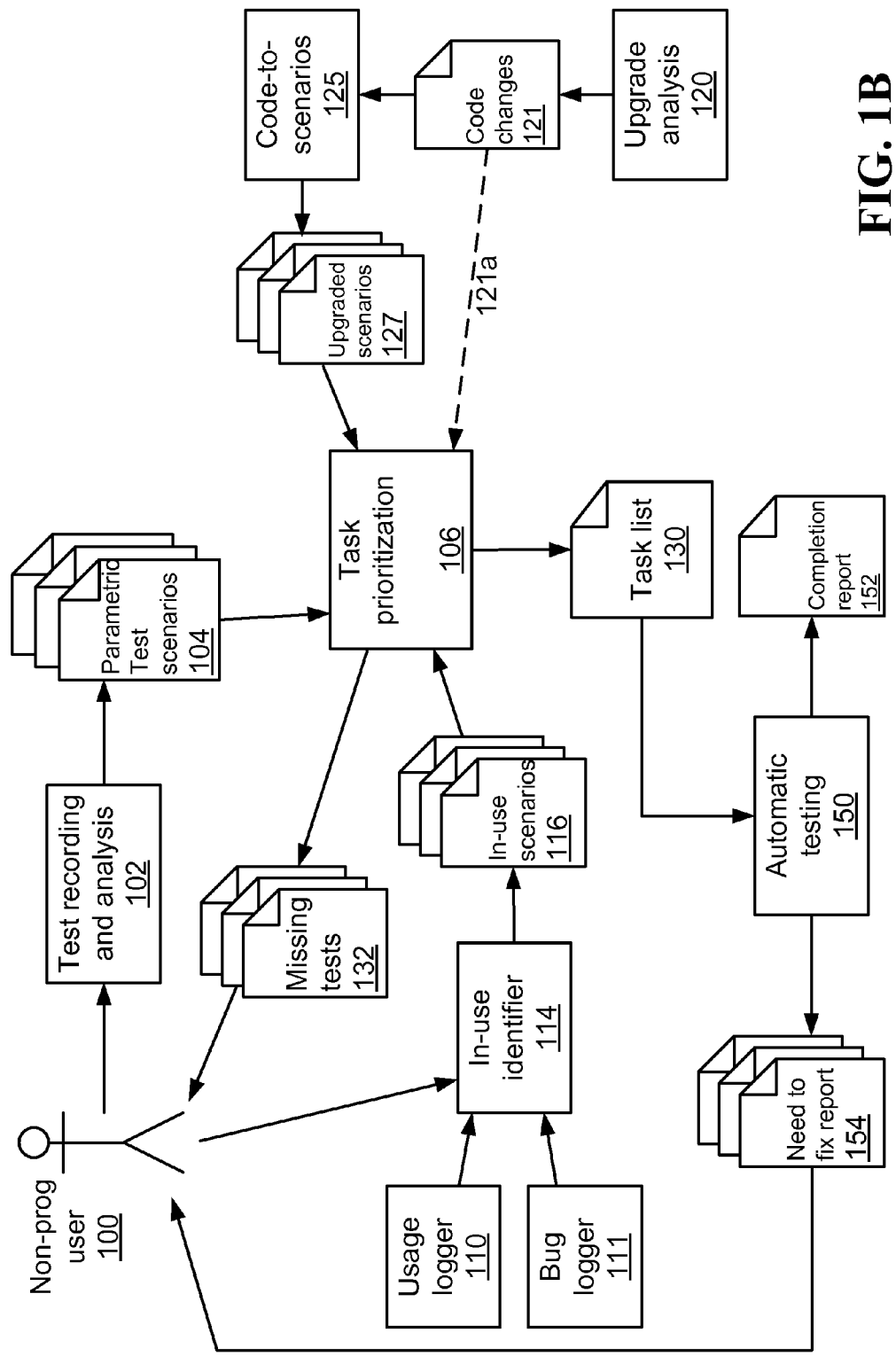

FIG. 1B illustrates a variation of the system illustrated in FIG. 1A, where code changes result from a software upgrade process. Upgrade analysis component 120, which may run a static impact analysis, outputs a list of code changes 121 resulting from the upgrading process. The list of code changes 121 is received by the code-to-scenarios component 125 that identifies the list of upgraded scenarios 127, which includes the business processes affected by the upgrade process.

Optionally, the upgrade analysis component 120 differentiates between required code changes resulting from the upgrade and required test scenarios resulting from the upgrade. Required code changes resulting from the upgrade 121a should usually be coded before their corresponding test scenarios can be recorded. The code changes are provided to a task prioritization component 106 to be added to a task list 130. Optionally, after the code changes are implemented, the upgrade analysis analyzes the code again in order to provide an updated list of upgraded scenarios 127.

Figure 1C:
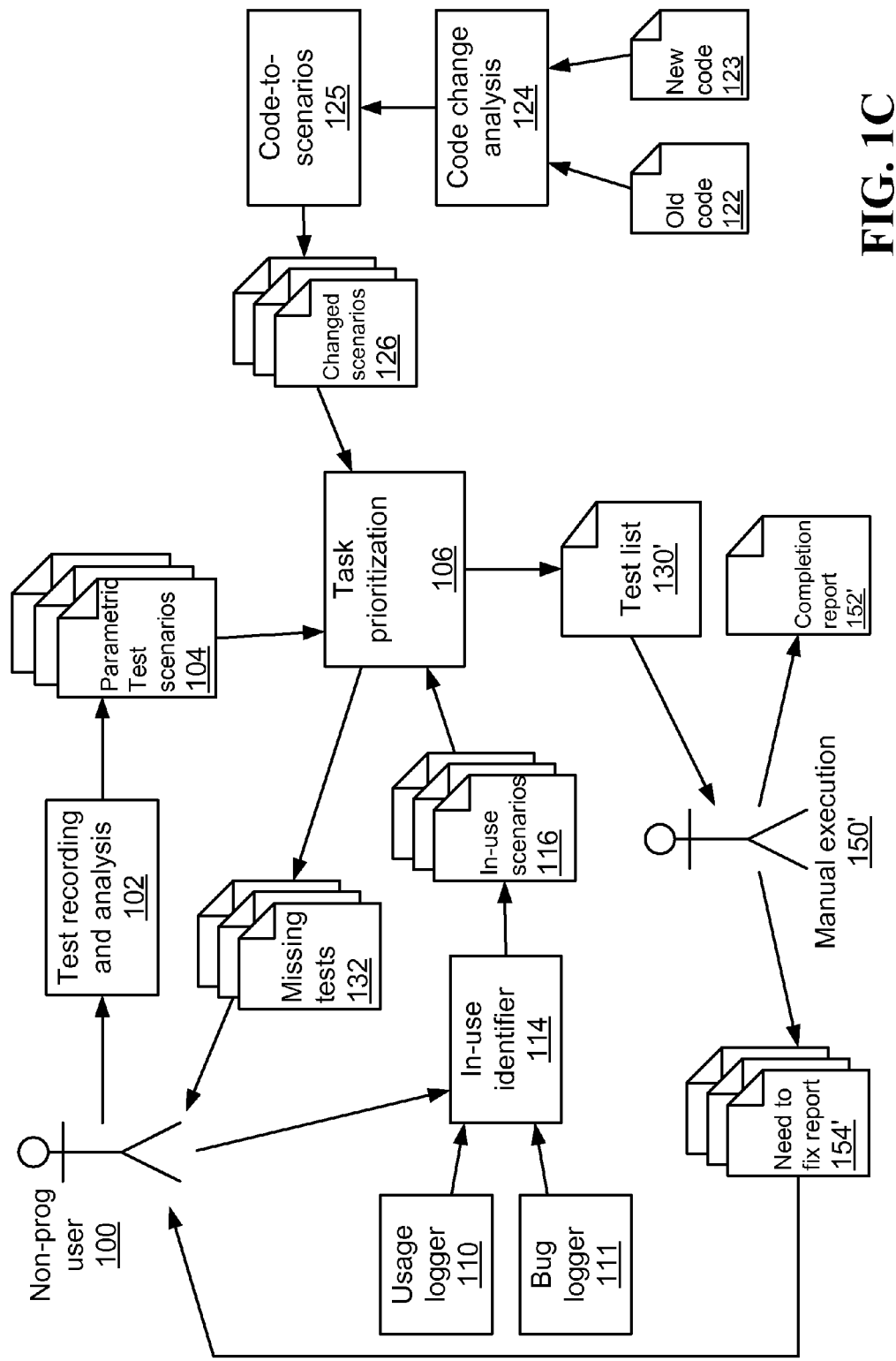
Figure 1D:
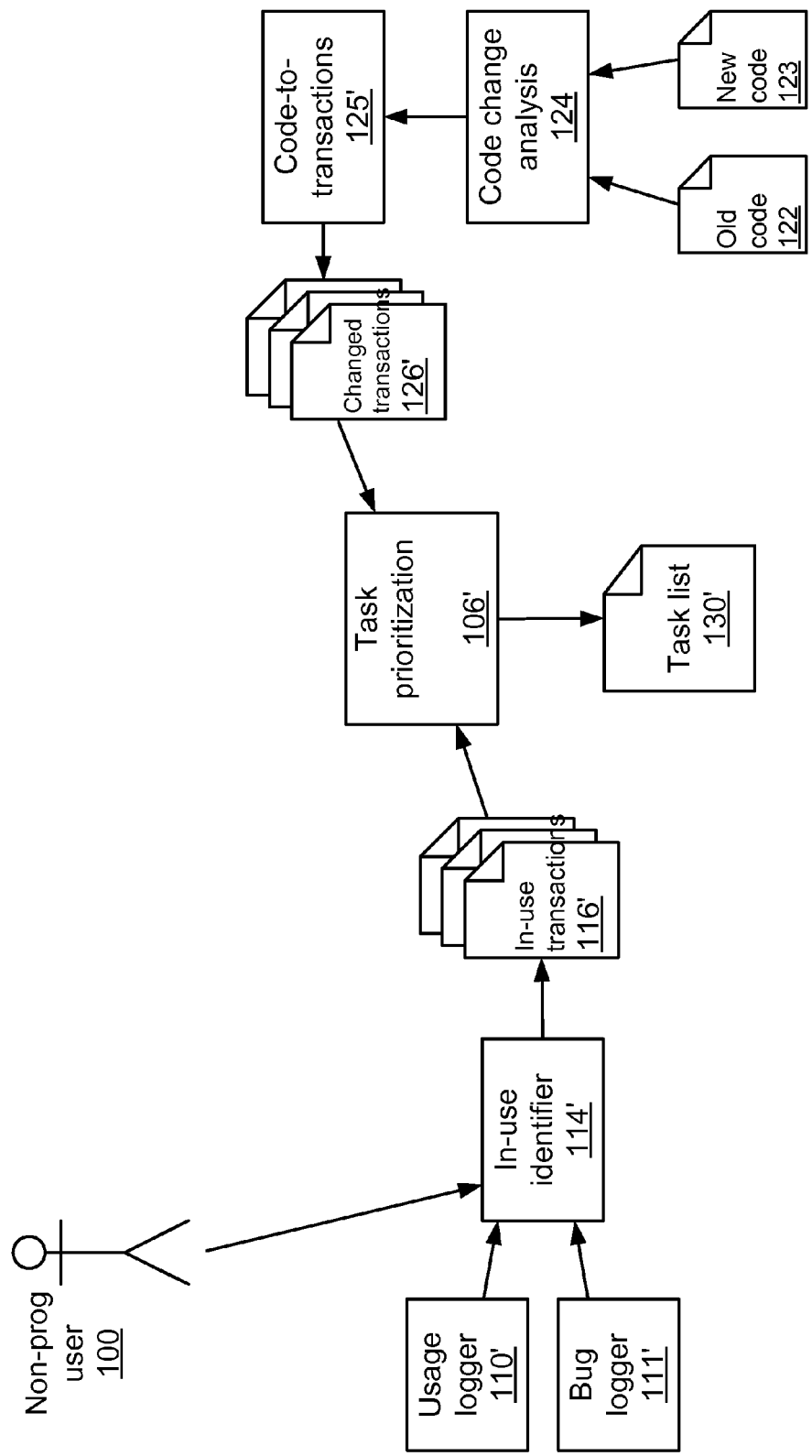
FIG. 1D illustrates one embodiment of sorting impact analysis results according to the usability of the impacted transactions in a specific organization.

FIG. 1D illustrates one embodiment of sorting impact analysis results according to the usability of the impacted transactions in a specific organization. An in-use identifier component 114' identifies transactions that are actually in use by the specific organization, referred to as in-use transactions 116'. In some embodiments, the in-use identifier component 114' receives inputs from one or more of the following: a usage logger 110' that registers the used transactions, a bug logger 111' that registers faults in the used transactions, and/or from a non-programmer user 100 that identifies the used transactions. The code change analysis component 124 receives as inputs an old code version 122 and a new code version 123, and identifies code that was changed or impacted because of replacing the old code version 122 with the new code version 123. The identified changed code is received by a code-to-transactions component 125'. Code-to-transactions component 125' identifies the list of changed transactions 126', which includes transactions that use at least some of the changed code or some of the code affected by the code change. Task prioritization 106' sorts the list of changed transactions 126' according to the list of in-use transactions 116'. In one example, the task prioritization 106' assigns a higher priority to changed transactions that are in-use than to similar changed transactions that are not in-use.

Figure 1E:
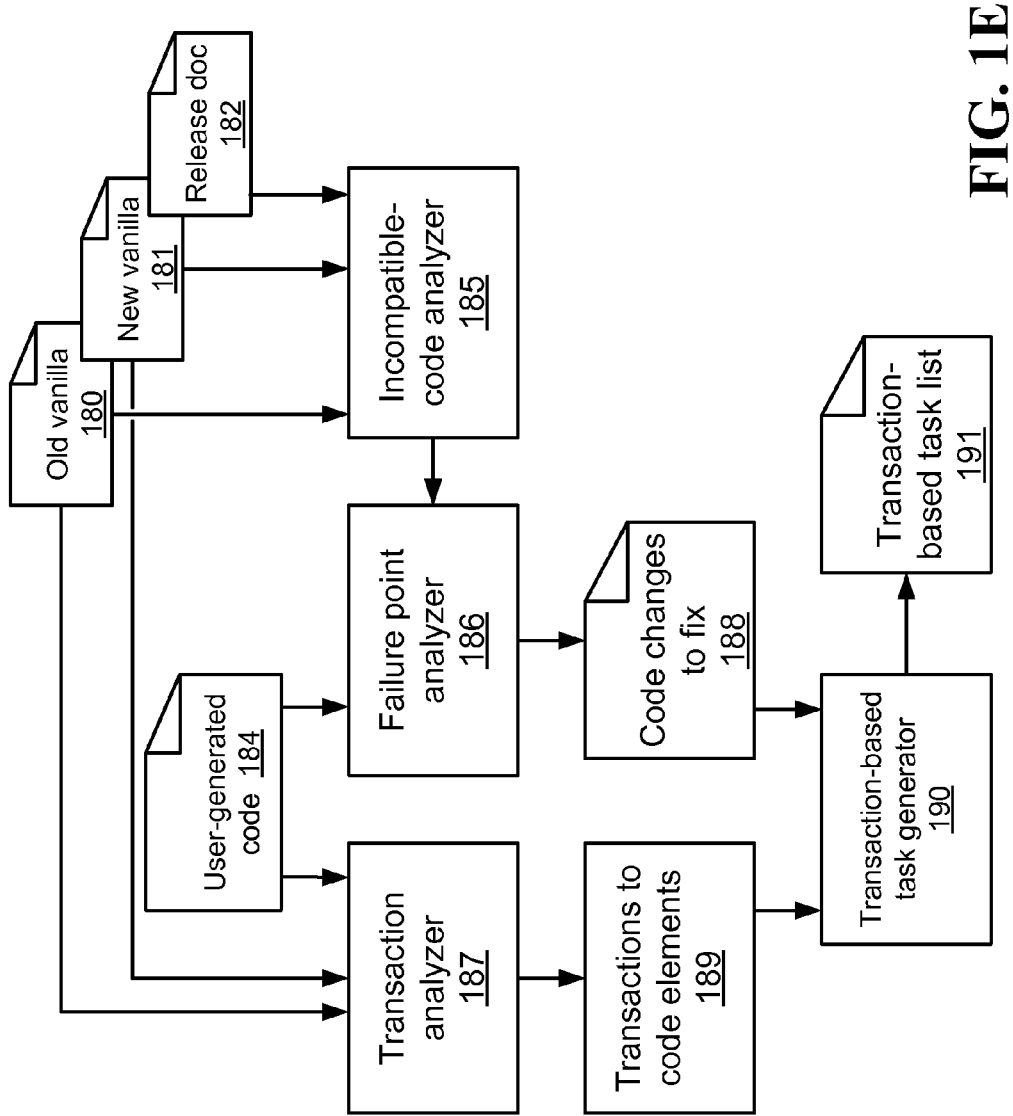
FIG. 1E illustrate one embodiment of system components useful for implementing various embodiments.

FIG. 1E illustrates another embodiment of system components useful for implementing various embodiments. The incompatible code analyzer 185 receives the old vanilla code 180, the new vanilla code 181, and optionally the release documents 182. The incompatible code is forwarded to the failure point analyzer 186 together with the user-generated code 184, in order to generate the code changes to fix 188. The old vanilla code 180, the new vanilla code 181, and the user-generated code 184 are also received by the transaction analyzer 187, which provides the identifies transactions to the transaction to code elements component 189. The code changes to fix 188 and the code elements from the transaction to code elements 189 are entered into the transaction-based task generator 190, which provides the transaction based task list 191.

Task prioritization component 106.

Referring back to FIG. 1A, in some embodiments, a task prioritization component 106 receives and indexes the parametric test scenarios 104, the in-use scenarios 116, and the scenarios affected by the code changes (referred to as the list of changed scenarios 126). The task prioritization component 106 outputs a task list 130 to be executed by the specific organization. The task list 130 describes both "what to test?" (by providing the automatic tests, manual tests, and other tasks) and "how to test?" (by associating the various tests with the proper parametric test scenarios 104 that describe how to handle the test results). The task prioritization component 106 sorts the tests to be executed (provided in the task list 130) based on its inputs and logic, such as test a subset of the in-use scenarios affected by an upgrade, and then test a subset of the in-use scenarios unaffected by the upgrade. The "how to test" is available when a parametric test scenario 104 covers an in-use scenario, so that running the parametric test scenario 104 can verify the in-use scenario.

In one embodiment, the task prioritization component 106 includes a list of code corrections that are calculated based on inconsistency. For example, when the code change analysis component 124 identifies that a certain procedure was deleted because of a code change/upgrade, or that the specific organization replaced a certain user-generated code with a non-compatible code, the business processes using the canceled or replaced procedure are identified as business processes to be fixed.

For clarity, FIG. 1A and some other figures are described in the context of components and lists. However, various alternative embodiments may be provided using combined components and/or lists, and/or provided using divided and/or additional components and/or lists. In addition, the other figures should cover any kind of modification that divide or integrate the various activities between the various components, as long as the disclosed system and the modified system provide similar benefits as a whole.

Identifying non-executable human-readable test scenarios to be updated due to code changes.

Figure 2A:
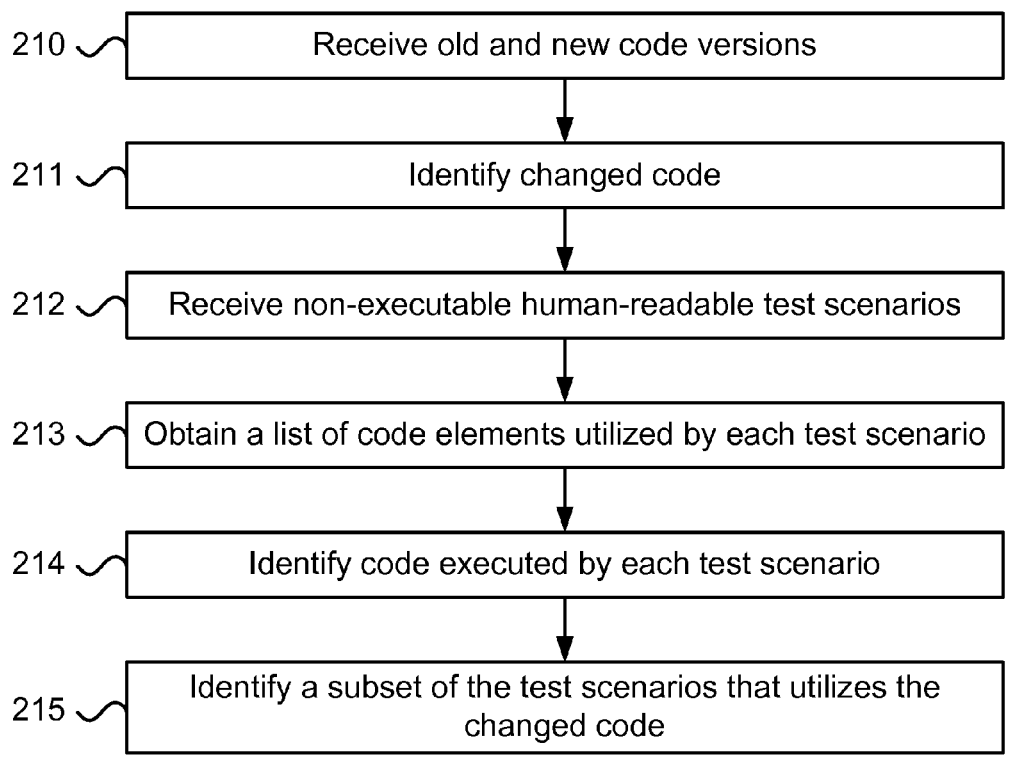
FIG. 2A and FIG. 2B illustrate embodiments for identifying non-executable human-readable test scenarios to be updated due to code changes.

FIG. 2A illustrates one embodiment of a method for identifying non-executable human-readable test scenarios to be updated due to code changes, optionally without utilizing impact analysis. The method comprising the following steps: In step 210, receiving an old code version and a new code version of a data-oriented large-scale software system. In step 211, identifying code elements in the old code version that were changed in the new code version, referred to as changed code. In step 212, receiving non-executable human-readable test scenarios, each tests at least two transactions. In step 213, analyzing the non-executable human-readable test scenarios to obtain a list of code elements utilized by each non-executable human-readable test scenario. Optionally, the non-executable human-readable test scenarios are parsed before analyzed. In step 214 running code-to-scenarios analysis to identify code executed by each non-executable human-readable test scenario. Optionally, an expected failure of each identified non-executable human-readable test scenario is described based on the changed code used by each identified non-executable human-readable test scenario. And in step 215, identifying a subset of the non-executable human-readable test scenarios that utilizes the changed code, and therefore has to be updated. Wherein identifying the subset of the non-executable human-readable test scenarios based on code-to-scenarios analysis provides more accurate results than identifying the subset based on code-to-transactions analysis. Optionally, the method further comprises the step of prioritizing the manual execution of the non-executable human-readable test scenarios based on the utilization of the changed code. Optionally, the non-executable human-readable test scenarios are generated automatically from recordings of user activities. Optionally, the user is provided with the identified non-executable human-readable test scenarios together with the expected failures. Optionally, the method further comprises providing a user with a task list for manually executing non-executable human-readable test scenarios, wherein the identified subset of the non-executable human-readable test scenarios features higher priorities than the remaining non-executable human-readable test scenarios. And optionally, the changed code comprises changed code customizations.

Figure 2B:
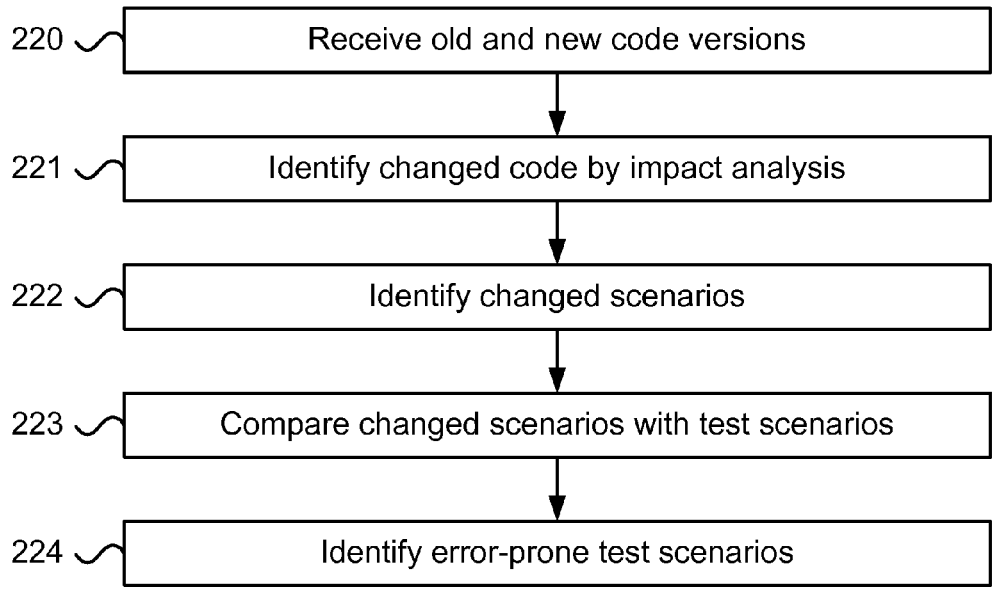
Figure 2C:
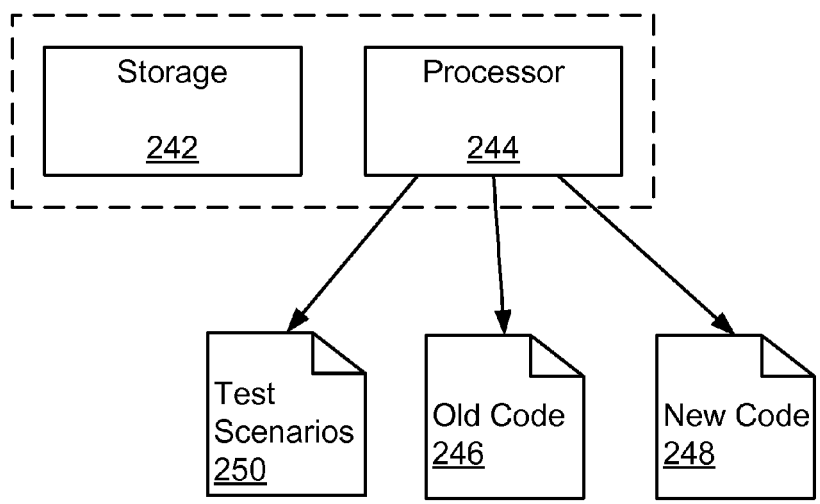
FIG. 2C illustrates one embodiment of a computer system to identify non-executable human-readable test scenarios to be updated due to code changes.

FIG. 2C illustrates one embodiment of a computer system to identify non-executable human-readable test scenarios to be updated due to code changes. The computer system comprising: a storage device 242 containing computer usable code, and a processing unit 244 operable to execute the computer usable code to: (i) Access an old code version 246 and a new code version 248 of a data-oriented large-scale software system. (ii) Identify code elements in the old code version 246 that were changed in the new code version 248, referred to as changed code. (iii) Access non-executable human-readable test scenarios 250, each tests at least two transactions. (iv) Analyze the non-executable human-readable test scenarios 250 to obtain a list of code elements utilized by each non-executable human-readable test scenario. (v) Run code-to-scenarios analysis to identify code executed by each non-executable human-readable test scenario. And (vi) Identify a subset of the non-executable human-readable test scenarios that utilizes the changed code, and therefore has to be updated. Optionally, the processing unit 244 further executes the computer usable code to prioritize manual execution of the non-executable human-readable test scenarios 250 based on the utilization of the changed code. Optionally, the processing unit 244 further executes the computer usable code to provide a user with the identified non-executable human-readable test scenarios together with expected failures. Optionally, the processing unit 244 further executes the computer usable code to provide a user with a task list for manually executing non-executable human-readable test scenarios 250, wherein the identified subset of the non-executable human-readable test scenarios features higher priorities than the remaining non-executable human-readable test scenarios. And optionally, the changed code comprises changed code customizations.

It is to be understood that FIG. 2C can also illustrate many other disclosed embodiments that use a storage device containing computer usable code and a processing unit operable to execute the computer usable code. Therefore, for the sake of simplicity and clarity, and without any intent to limit the scope of the claims in any way, the applicants do not provide figures of alternative embodiments that are understandable with reference to FIG. 2C.

FIG. 2B illustrates one embodiment of a method for identifying non-executable human-readable test scenarios to be updated due to code changes, utilizing impact analysis. The method comprising the following steps. In step 220, receiving an old code version and a new code version of a data-oriented large-scale software system. In step 221, identifying changed code by running impact analysis on the old code version and the new code version. In step 222, identifying scenarios that use the changed code, referred to as changed scenarios. Wherein a scenario defines an activity that operates at least two transactions in a specific way and therefore scenario-based identification provides more accurate results than a transaction-based identification. In step 223, comparing the changed scenarios with non-executable human-readable test scenarios. Optionally, the non-executable human-readable test scenarios are parsed before comparing them with the changed scenarios. And in step 224, identifying the non-executable human-readable test scenarios that correspond to the changed scenarios, referred to as error-prone non-executable human-readable test scenarios. Optionally, the method further comprises the step of prioritizing the manual execution of the identified non-executable human-readable test scenarios such that the error-prone non-executable human-readable test scenarios feature higher priorities than the other non-executable human-readable test scenarios. Optionally, the user is provided with a prioritized task list for manually executing the identified non-executable human-readable test scenarios. Optionally, an expected failure of at least one identified non-executable human-readable test scenario is described based on the changed code used by each identified non-executable human-readable test scenario. Optionally, the user is provided with the identified non-executable human-readable test scenarios together with the expected failures. And optionally, the changed code comprises changed code customizations.

In one embodiment, the task prioritization component 106 identifies missing test scenarios 132 when it receives an indication of an in-use scenario 116 that is not covered by the current parametric test scenarios 104. In one embodiment, the missing test scenarios 132 are provided to the non-programmer user 100 for recording. In another embodiment, the missing test scenarios 132 are provided to the non-programmer user 100 for recording new test scenarios, as part of the task list 130. If needed, before recording a missing test that is not entirely understandable from the missing tests 132, the non-programmer user 100 may contact an end-user associated with the missing test to receive more information.

It is noted that when the recording process is substantially unnoticeable or simple enough, even a junior end-user can record test scenarios during his/her regular course of action, or as needed according to the list of missing tests 132.

In some embodiments, the task prioritization component 106 may identify scenarios 126 that utilize recently-updated user-generated code as missing test scenarios, even when the identified scenarios do not correspond to the in-use scenarios 116. The reason is that support packages and upgrades by the software platform provider should change only the vanilla code and are not directly related to the organization-specific in-use scenarios. Contrary to changes by the software provider, new changes to the user-generated code are performed on behalf of the specific organization and therefore may indicate that the changed code is valuable for the specific organization.

In some embodiments, after a major system upgrade, changed scenarios 126 that do not appear in the list of the in-use scenarios 116 are identified as missing tests bearing lower priority than the changed scenarios 126 that do appear in the list of the in-use scenarios 116. The reason is that these changed scenarios may become important to the organization as a result of the major system upgrade.

In one embodiment, in-use is detected based on authorization preferences, such as Oracle Applications User Management, Oracle Applications Responsibility Management, and/or Oracle Authorization Policy Manager. Heuristic analysis (also known as heuristic evaluation) is applied to the various authorizations to reveals the business processes exposed to the non-super-users, which may provide a good indication of the in-use business processes. Super-users are usually excluded from the heuristic analysis because they may have extra irrelevant authorizations, while non-super-users are usually unauthorized to irrelevant operations in order to remove unnecessary options from their menu, improve business agility, manage security from a single place, separates security decisions from application logic, and to enables reuse and sharing of security services.

Automatic identification of missing test scenarios based on a list of in-use scenarios.

Figure 3A:
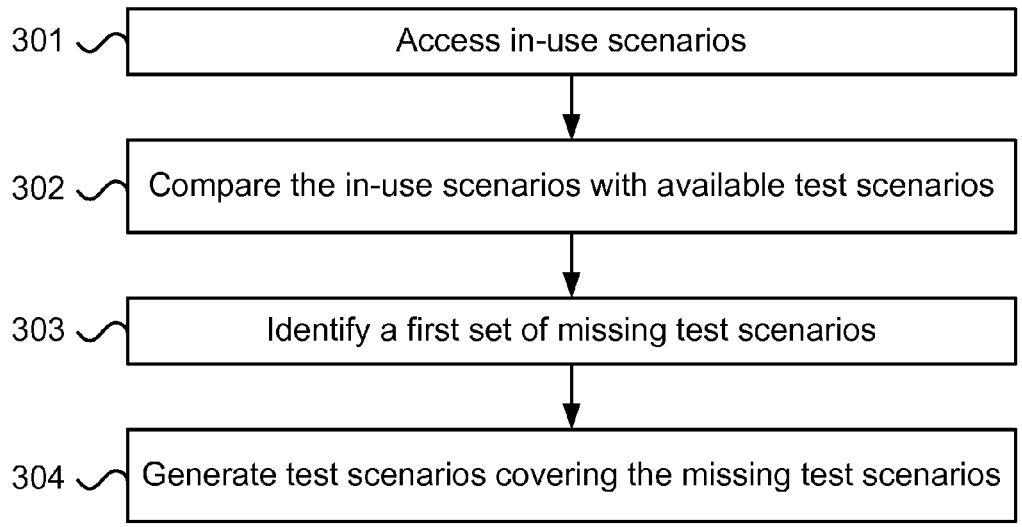
FIG. 3A illustrates one embodiment of a method for identifying missing test scenarios based on a repository of organization-specific in-use scenarios.

FIG. 3A illustrates one embodiment of a method for identifying missing test scenarios based on a repository of organization-specific in-use scenarios. The method comprising the following steps: In step 301, accessing a set of scenarios that are actually executed by a specific organization on a data-oriented large-scale software system, referred to as organization-specific in-use scenarios. Optionally, each organization-specific in-use scenarios executes least two transactions. Optionally, the organization-specific in-use scenarios are identified by registering the executed transactions and registering the order of executing the transactions. Additionally or alternatively, the organization-specific in-use scenarios are identified by registering the context of executing the transactions. Additionally or alternatively, the organization-specific in-use scenarios are identified by registering the executed transactions and then converting the registered transactions to scenarios utilizing a transaction-to-scenario mapping. In step 302, comparing the organization-specific in-use scenarios with available test scenarios repairable by a non-programmer user. Optionally, each available test scenario repairable by a non-programmer user tests at least two transactions. In step 303, identifying organization-specific in-use scenarios that do not have corresponding test scenarios repairable by a non-programmer user, referred to as first set of missing test scenarios. And in step 304, providing at least one of the missing test scenarios to a non-programmer user for generating a test scenario repairable by a non-programmer user, which covers the at least one missing test scenario. Optionally, the step of generating the test scenario repairable by a non-programmer user comprises recording the non-programmer user executing the missing test scenario. Optionally, the generated test scenario repairable by a non-programmer is a parametric test scenario repairable by a non-programmer user, which defines different alternatives for executing the test scenario. Optionally, the parametric test scenario repairable by a non-programmer user further defines different alternatives for evaluating the execution outcome, and is expressed in terms that substantially conform to terms used in the non-programmer user's work environment, and coherent with actual manual operation of the test scenario. Optionally, the method further comprises the steps of identifying a second set of missing test scenarios having scenarios that utilize recently-updated user-generated code; assigning the first set of missing test scenarios a higher priority than the second set of missing test scenarios; and providing the first and second sets to the non-programmer user for generating corresponding parametric test scenario repairable by a non-programmer user. And optionally, the data-oriented large-scale software system had a recent major system upgrade, and further comprising the steps of identifying most of the scenarios that were changed because of the system upgrade as missing test scenarios; and assigning higher priority to changed scenarios that do have corresponding organization-specific in-use scenarios than to changed scenarios that do not have corresponding organization-specific in-use scenarios; whereby certain scenarios may become important to the organization as a result of the major system upgrade.

Figure 3B:
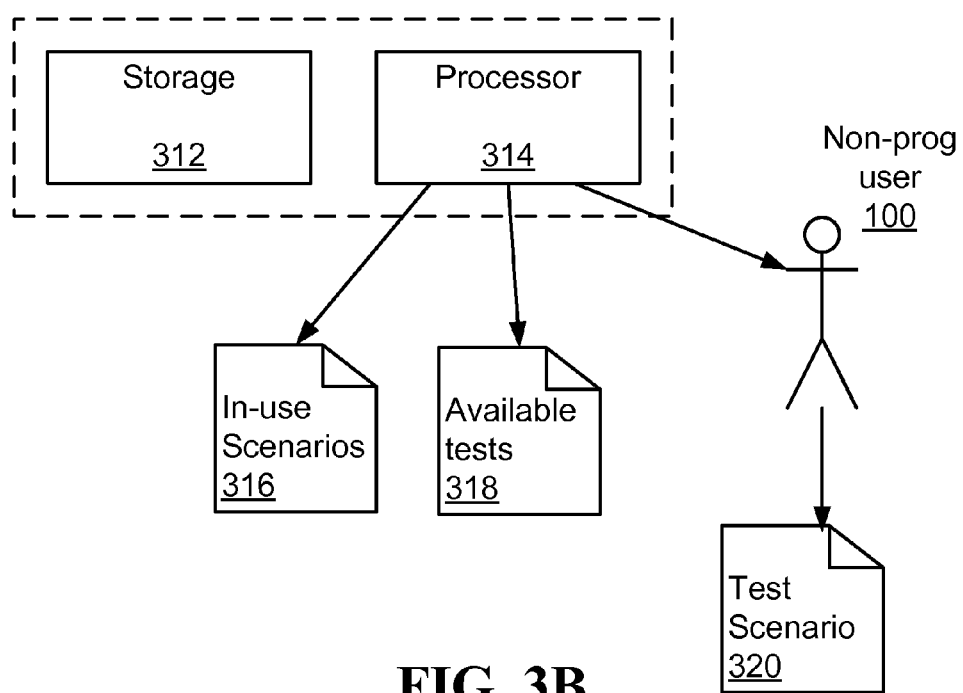
FIG. 3B illustrates one embodiment of a computer system to identify missing test scenarios based on a repository of organization-specific in-use scenarios.

FIG. 3B illustrates one embodiment of a computer system to identify missing test scenarios based on a repository of organization-specific in-use scenarios. The computer system comprising: a storage device 312 containing computer usable code, and a processing unit 314 operable to execute the computer usable code to: (i) Access a set of scenarios that are actually executed by a specific organization on a data-oriented large-scale software system, referred to as organization-specific in-use scenarios 316. Optionally, Each organization-specific in-use scenario executes least two transactions. (ii) Compare the organization-specific in-use scenarios 316 with available test scenarios repairable by a non-programmer user 318. Optionally, each available test scenario repairable by a non-programmer user tests at least two transactions. (iii) Identify organization-specific in-use scenarios that do not have corresponding test scenarios repairable by a non-programmer user, referred to as first set of missing test scenarios. And (iv) Provide at least one of the missing test scenarios to a non-programmer user 100 to generate a test scenario repairable by a non-programmer user 320 that covers the at least one missing test scenario. Optionally, the processing unit further executes the computer usable code to identify the organization-specific in-use scenarios by registering the executed transactions and registering the order of executing the transactions. Optionally, the processing unit further executes the computer usable code to identify the organization-specific in-use scenarios by registering context of executing the transactions. Optionally, the processing unit further executes the computer usable code to identify a second set of missing test scenarios comprising scenarios that utilize recently-updated user-generated code, assign the first set of missing test scenarios a higher priority than the second set of missing test scenarios, and provide the first and second sets to the non-programmer user to generate the corresponding parametric test scenarios repairable by a non-programmer user. And optionally, the data-oriented large-scale software system had a recent major system upgrade, and the processing unit further executes the computer usable code to: identify most of the scenarios that were changed because of the system upgrade as missing test scenarios, and assign higher priority to changed scenarios that do have corresponding organization-specific in-use scenarios than to changed scenarios that do not have corresponding organization-specific in-use scenarios.

Figure 3C:
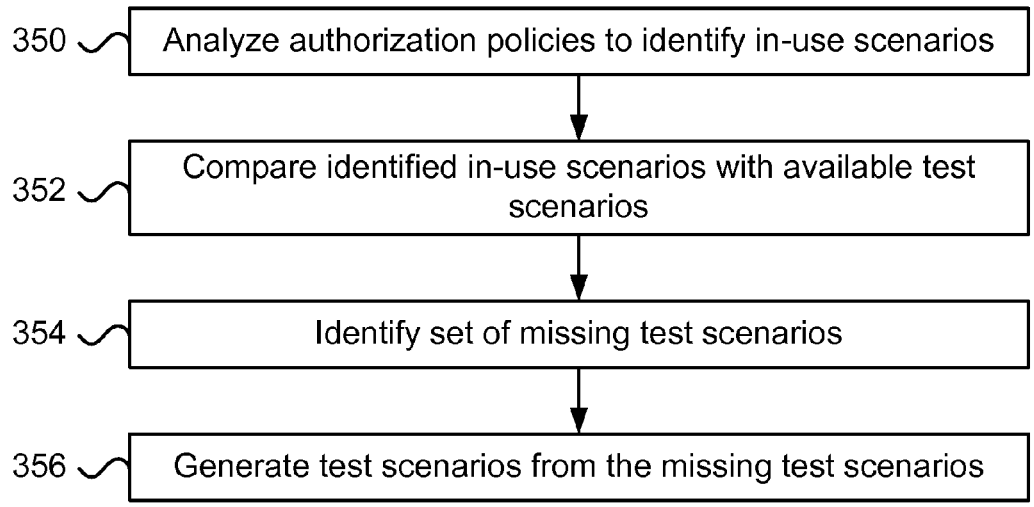
FIG. 3C illustrates one embodiment of a method for identifying missing test scenarios based on authorization policies.

FIG. 3C illustrates one embodiment of a method for identifying missing test scenarios based on authorization policies. The method comprising the following steps: In step 350, analyzing the authorization policies applied to non-super-users of a specific data-oriented large-scale software system in order to identify organization-specific in-use scenarios. The reason for analyzing the authorization policies applied to non-super-users is that the non-super-users are usually unauthorized to irrelevant operations. In step 352, comparing the identified organization-specific in-use scenarios with available test scenarios repairable by a non-programmer user. Optionally, each available test scenario repairable by a non-programmer user tests at least two transactions. In step 354, identifying organization-specific in-use scenarios that do not have corresponding test scenarios repairable by a non-programmer user, referred to as first set of missing test scenarios. And in step 356, providing at least one of the missing test scenarios to a non-programmer user, having proper authorizations, for generating a test scenario repairable by a non-programmer user that covers the at least one missing test scenario. Optionally, the data-oriented large-scale software system is Oracle ERP and the authorization policies are taken from Oracle Applications User Management and/or from Oracle Applications Responsibility Management. Optionally, the generated test scenario repairable by a non-programmer is a parametric test scenario repairable by a non-programmer user, which defines different alternatives for executing the test scenario. Optionally, the parametric test scenario repairable by a non-programmer user further defines different alternatives for evaluating the execution outcome, and is expressed in terms that substantially conform to terms used in the non-programmer user's work environment, and coherent with actual manual operation of the test scenario.

In one embodiment, the data-oriented large-scale software system is Oracle ERP. Oracle Applications User Management and Oracle Applications Responsibility Management are used to assess the authorizations because Oracle Applications Responsibility Management includes the menus exposed to the users, and the exposed menus set the screens that are used by the users. Therefore, the forms exposed to each user are identified by analyzing the responsibilities. Optionally, Oracle transactions are selected from the group of forms, workflow, reports, concurrent programs, and other executable units. Optionally, Oracle business processes are selected from the group of forms, workflows, reports, and/or concurrent programs.

Figure 3D:
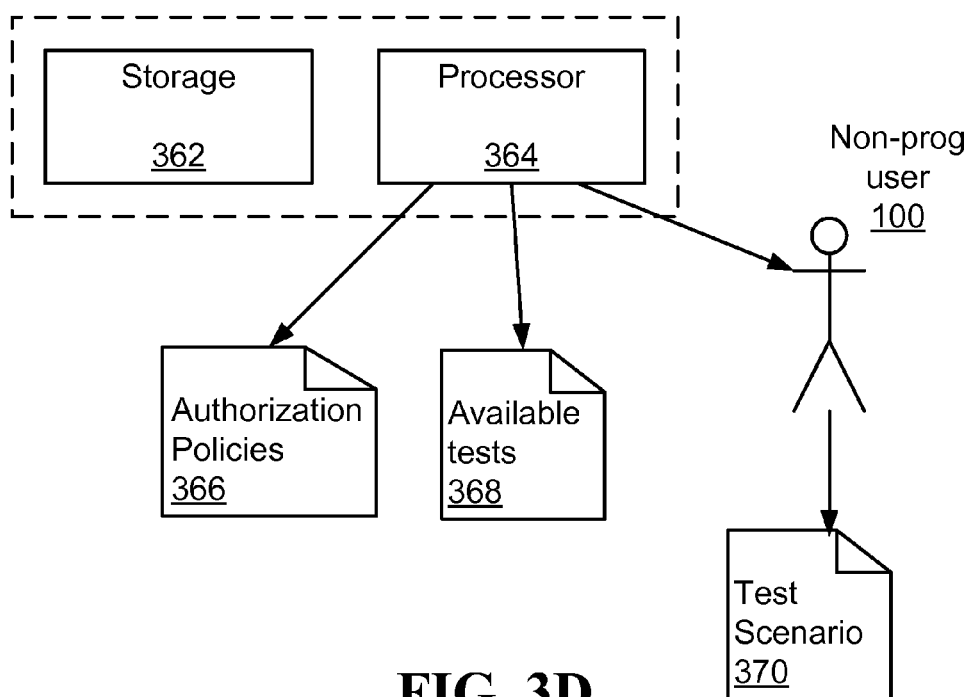
FIG. 3D illustrates one embodiment of a computer system to identify missing test scenarios based on authorization policies.

FIG. 3D illustrates one embodiment of a computer system to identify missing test scenarios based on authorization policies. The computer system comprising: a storage device 362 containing computer usable code, and a processing unit 364 operable to execute the computer usable code to: (i) analyze the authorization policies 366 applied to non-super-users of a specific data-oriented large-scale software system in order to identify organization-specific in-use scenarios. (ii) Compare the identified organization-specific in-use scenarios with available test scenarios repairable by a non-programmer user 368, where each available test scenario repairable by a non-programmer user tests at least two transactions. (iii) Identify organization-specific in-use scenarios that do not have corresponding test scenarios repairable by a non-programmer user, referred to as first set of missing test scenarios. And (iv) provide at least one of the missing test scenarios to a non-programmer user 100, having proper authorizations, to generate a test scenario repairable by a non-programmer user 370 that covers the at least one missing test scenario. Optionally, the data-oriented large-scale software system is Oracle ERP and the authorization policies are taken from Oracle Applications User Management and Oracle Applications Responsibility Management. Optionally, the generated test scenario repairable by a non-programmer is a parametric test scenario repairable by a non-programmer user, which defines different alternatives for executing the test scenario. And optionally, the parametric test scenario repairable by a non-programmer user further defines different alternatives for evaluating the execution outcome, and is expressed in terms that substantially conform to terms used in the non-programmer user's work environment, and coherent with actual manual operation of the test scenario.

Automatic identification of missing test scenarios based on analyzing test results of a changed business process.

In one embodiment, a method for identifying missing test scenarios based on changes in test results comprising the following steps: (i) Receiving an indication of a code change or a customization change applied to a business process. (ii) Executing substantially all parametric test scenarios related to the business process. And (iii) if all the parametric test scenarios were executed properly, suggesting that the executed parametric test scenarios are insufficient to test the changed business process.

In another embodiment, a method for identifying missing test scenarios based on changes in test results comprising the following steps: (i) Receiving the results of executing essentially all parametric test scenarios related to a business process before making a code or customization change to the business process. (ii) Receiving the results of executing essentially all parametric test scenarios related to the business process after making the code or customization change to the business process. (iii) Searching for behavioral changes reflected in the differences between the results received before and after making the changes to the business process. And (iv) Suggesting that the executed parametric test scenarios are insufficient to test the business process if less than a predetermined amount of behavioral changes are found.

Automatic testing component 150.

In some embodiments, the task list 130 is executed automatically by an automatic testing component 150. Optionally, the automatic testing component 150 provides a completion report 152 that lists the successfully completed tests, and a need to fix report 154 that lists the parametric test scenarios 104 that have to be fixed. The test scenarios on the need to fix report 154 are forwarded to the non-programmer user 100 to be re-recorded based on their descriptions.

In one embodiment, the automatic testing component 150 runs on an image of the tested system. The image is updated from time to time in order to ensure that the tests run on relevant data. Optionally, the automatic testing component 150 queries a database of the new installation in order to obtain relevant values to be entered. One example of querying the database includes the following steps: reading from a parametric test scenarios 104 a parametric entry value representing a catalog number of a certain product available in a certain warehouse; the automatic testing component 150 querying the database of the new installation for one or more catalog numbers of the certain product in the certain warehouse; substituting the returned value into the parametric entry value; and trying to execute the test scenario. Optionally, the automatic testing component 150 retrieves multiple values from the database and tries executing the test scenario multiple times with different values. In addition, the automatic testing component 150 may calculate the proper value of a parametric entry value. For example, the automatic testing component 150 may calculate a future date or multiply a result by a predefined factor.

Running automatic tests on a data-oriented large-scale software system, such as ERP, is a complicated task because the ERP environment is full of dependencies and preconditions making it impossible to run prerecorded test scenarios with their originally recorded values. As a result, the automatic testing component 150 has to substitute valid values into the executed test, where the valid values should fit the specific installation and state of data. For example, a user records a scenario that opens a new order, ships a product from a warehouse, and then closes the order. However, the next day when the automatic testing component 150 will try to rerun the recorded scenario it will have to substitute a different order number (because the recorded order number already exists in the system), will have to ship a different unit of the product from the warehouse (because the recorded product was shipped and, thus, does not exist anymore in the warehouse), and then will have to use the new order number to close the order. Therefore, the obsolete recorded values have to be replaced by valid values.

The automatic testing component 150 also has to handle system, setup, and/or business process changes, which occur from time to time. For example, after recording a test scenario, a new unrecorded field may be marked as mandatory. Thus, the resulting parametric test scenario 104 has to be completed, manually or automatically, with the newly added mandatory field.

Failures to execute parametric test scenarios 104, also referred to as bugs, may result from both code errors and obsolete parametric test scenarios 104. Code errors may be fixed by code changes. Obsolete parametric test scenarios 104 may result from either incomplete parametric test scenarios 104 or inaccurate parametric test scenarios 104. Incomplete parametric test scenarios 104 do not include clear specification of how to handle certain instances of a business process, optionally resulting from generating the parametric test scenarios 104 from partial data, such as a set of recordings that do not cover all the variations of the business process. Inaccurate parametric test scenarios 104 do not describe the current version of the business process well, optionally resulting from updating the business process without updating its related parametric test scenarios 104. The obsolete parametric test scenarios 104 may be fixed by updating the parametric test scenarios 104, optionally using re-recordings, wizards, automatic updates based on similar updates, and/or manual updates of the test specifications.

Optionally (not illustrated in FIG. 1A), the need to fix report 154 includes both bugs resulting from obsolete parametric test scenarios 104 and bugs resulting from code errors. The bugs resulting from code errors may be added to the list of code changes 121 in order to be fixed by code changes, and then, as described above, the code changes are associated with the affected scenarios that are to be retested.

In one embodiment, all the tests detailed in the need to fix report 154, which are the tests that were not completed successfully by the automatic testing component 150, are forwarded to the non-programmer user 100 who decides which of the tests have to be re-recorded and which of the tests have to be forwarded to the programmer for code change. In this embodiment, the non-programmer user 100 analyzes the tests on the need to fix report 154 manually because there are cases where the automatic testing component 150 fails while the code is fine. For example, the automatic testing component 150 may fail executing a parametric test scenario 104 by opening order that is not in delay instead of a order in delay (as needed by the specific scenario). As a result, the automatic testing will not receive the screen that deals with the delay, and the execution will fail. In such examples, the non-programmer user 100 may re-record the scenario in a way that will enable the test recording and analysis component 102 to understand it has to select an open order in delay, and/or add proper comments to the parametric test scenario 104. For example, in order to indicate that the scenario has to receive an open order, the user may add to the re-recording a step of querying the system about the opened scenarios.

Alternatively, the non-programmer user 100 may update the scenario using a wizard that helps in parameterizing the scenario. In some embodiments, a business process may change to a degree where it is better to replace the previous parametric test scenario 104 with a new parametric test scenario 104, created from a newly recorded test scenario, and preferably recorded on the new installation.

In one embodiment, the automatic testing component 150 determines automatically, based on the type of failure, which of the unsuccessful tests are to be forwarded to the non-programmer user 100, and which are to be forwarded to a programmer. For example, a parametric test scenario 104 failing with an internal system error, an activation error, or a compilation error—is forwarded to a programmer for code change. Examples of internal system errors include exceptions in Java and unexpected errors in ABAP. Optionally, the remaining failures, such as failed test scenarios that do not result in the expected values, are forwarded to the non-programmer user 100.

In one embodiment, a test scenario that failed when executed by the automatic testing component 150 is executed automatically until its failure point, or until a few steps ahead of its failure point. Then, the non-programmer user 100 fixes the test scenario by re-recording the test scenario using the GUI. And then the system updates the parametric test scenario 104 automatically based on the initial semi-automatic run and the later manual recording.

Optionally, and assuming only an intermediate section of the parametric test scenario is identified as different in the re-recording of the test scenario (compared to the failed test scenario), the system checks whether it can continue executing the remaining of the failed test scenario. If it can continue, the user is not required to re-record the remaining steps of the failed test scenario.

In one embodiment, the user is directed to re-record a scenario in a way that will enable the test recording and analysis component 102 to identify the right parameter for a certain screen. For example, in order to indicate the test recording and analysis component 102 that a scenario has to receive an open order, the user may re-record an additional step of querying the system about the opened scenarios. Alternatively, the non-programmer user 100 may update the scenario using a wizard that helps in parameterizing the scenario. In some embodiments, a business process may change to a degree where it is better to replace the previous parametric test scenario 104 with a new parametric test scenario 104, created from a newly recorded test scenario, and preferably recorded on the new installation.

Methods for handling failed test scenarios.

Figure 6A:
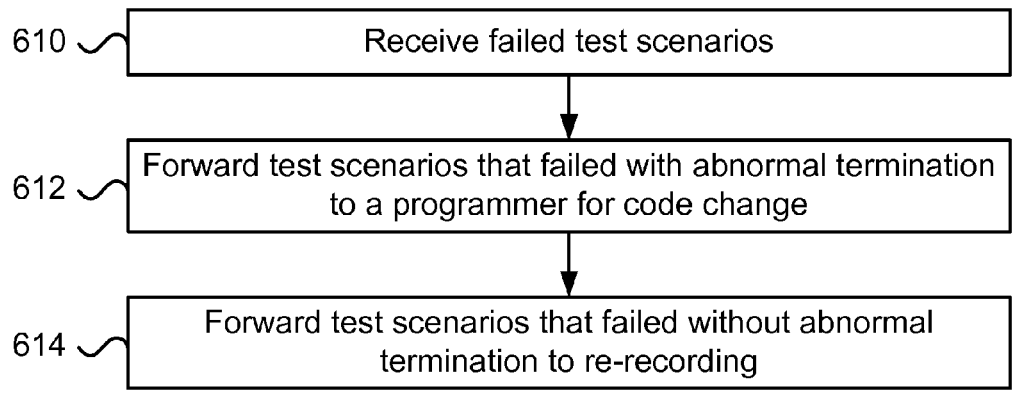
FIG. 6A illustrates one embodiment of a method for determining whether to correct a failed test scenario using re-recording or code change.
Figure 6B:
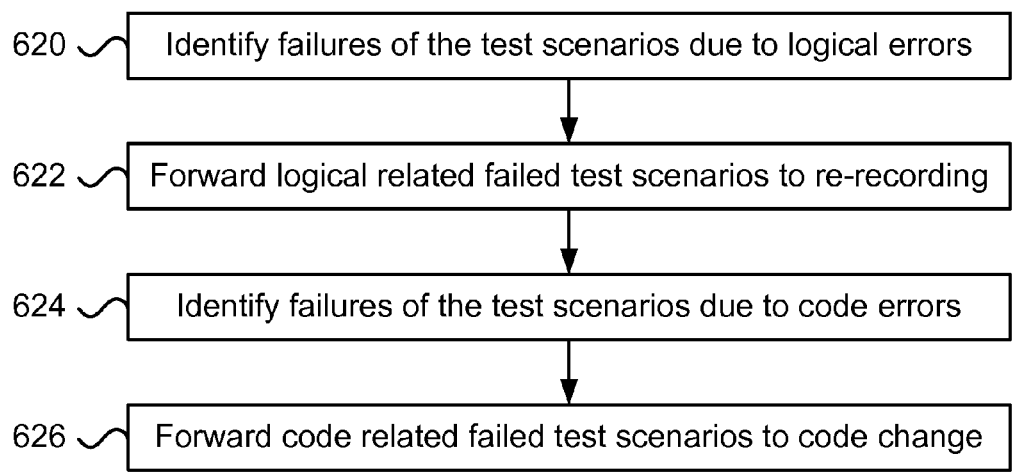
FIG. 6B illustrates one embodiment of a method for processing failures of executing test scenarios over a data-oriented large-scale software system.

FIG. 6A illustrates one embodiment of a method for determining whether to correct a failed test scenario using re-recording or code change. The method comprising the following steps. In step 610, receiving descriptions of test scenarios that failed while executed by an automatic testing component; wherein at least 50% of the test scenarios are expressed by user interaction activities and not code-related language. In step 612, identifying the test scenarios that failed with abnormal termination as test scenarios to be forwarded to a programmer for code change, wherein abnormal termination does not include normal termination with a value different from an expected value. Optionally, the abnormal termination is selected from the group of: internal system errors, activation errors, and compilation errors. Optionally, the computer runs Java programming language, and the internal system errors are Java exceptions. Alternatively, the computer runs ABAP programming language, and the internal system errors are ABAP unexpected errors. And in step 614, identifying the test scenarios that failed without abnormal termination as test scenarios to be forwarded to a non-programmer user for re-recording or manual evaluation. In some cases, re-recording of scenarios that failed with abnormal termination has less than 20% chance to fix the abnormal termination failure, and therefore the test scenarios that failed with abnormal termination are forwarded to the programmer for code change. Optionally, the automatic testing component executes the test scenarios on a data-oriented large-scale software system, and the test scenarios that failed without abnormal termination comprise test scenarios that do not result in predefined expected values because of insufficient description of the test scenarios, while the data-oriented large-scale software system's code is expected to be error-free; and generating a human-readable notice to request confirmation to add execution result to expected results of the test scenario. Optionally, the method further comprises identifying a test scenario that failed without abnormal termination because of a missing prerequisite, and generating a human-readable notice to encourage the non-programmer user to re-record one or more additional steps to reveal the missing prerequisites. Optionally, the method further comprises identifying a test scenario that failed without abnormal termination because of a missing prerequisite, and generating a human-readable notice to suggest a possible value for the missing prerequisite. Optionally, the method further comprises identifying a test scenario that failed without abnormal termination because of a missing prerequisite, and directing the non-programmer user to re-record a scenario in a way that enables a test recording and analysis component to identify a functioning parameter for a certain screen. Optionally, the manual evaluation of the test scenarios that failed without abnormal termination comprise activities selected from the group of: indicating that the test scenarios are in order although resulted in error messages, changing preferences indicating that the received messages are acceptable, adding expected results to approve the test scenarios, and/or re-recording the test scenarios FIG. 6B illustrates one embodiment of a method for processing failures of executing test scenarios over a data-oriented large-scale software system. The method comprising the following steps. In step 620, identifying failures of the test scenarios due to logical errors in the failed test scenarios. Optionally, the logical errors result from parametric test scenarios that do not include clear specification of how to handle certain instances of a business process. Optionally, the logical errors result from missing coverage of all the variations of the business process tested by the test scenario. Optionally, the logical errors result from an inaccurate description of the business process. In step 622, forwarding the identified logical related failed test scenarios to a non-programmer user for re-recording. Optionally, the non-programmer user is directed to re-record a scenario in a way that enables a test recording and analysis component to identify a missing prerequisite for a certain screen. In step 624, identifying failures of the test scenarios due to code errors. Optionally, the code errors cause abnormal termination, and the abnormal termination does not include normal termination with a value different from expected value. Optionally, the abnormal termination is selected from the group of: internal system errors, activation errors, and compilation errors. Optionally, the computer runs Java programming language, and the internal system errors are Java exceptions. Optionally, the computer runs ABAP programming language, and the internal system errors are ABAP unexpected errors. And in step 626, forwarding the identified code related failed test scenarios to a programmer for code change.

Figure 6C:
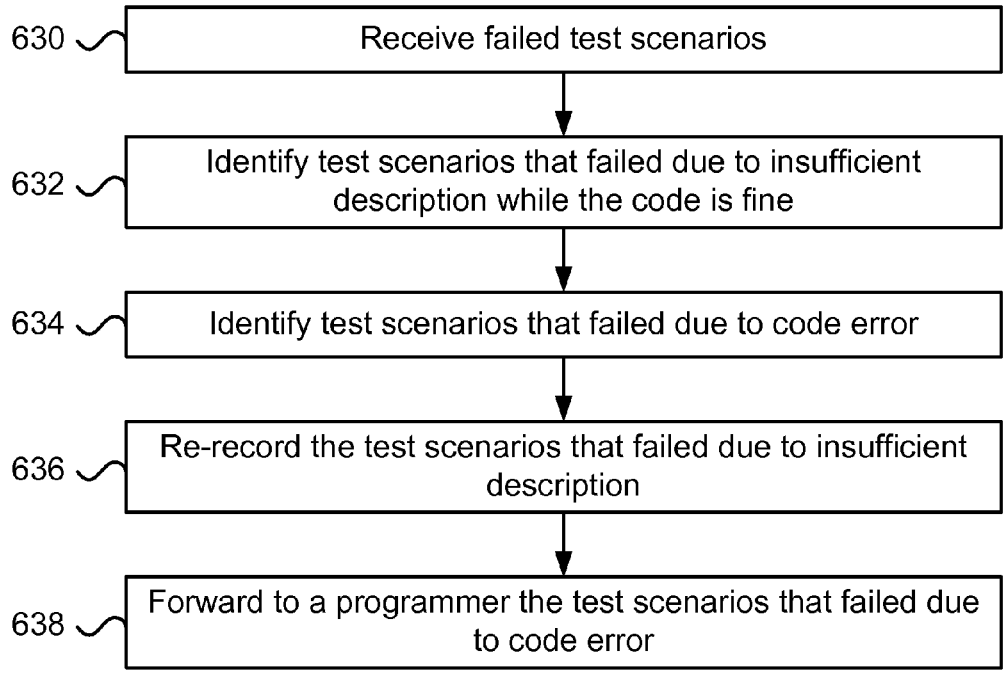
FIG. 6C illustrates one embodiment of a method for correcting test scenarios using re-recording.

FIG. 6C illustrates one embodiment of a method for correcting test scenarios using re-recording. The method comprising the following steps: In step 630, receiving descriptions of test scenarios that failed while executed by an automatic testing component; wherein at least 50% of the test scenarios are expressed by user interaction activities and not code-related language. In step 632, identifying the test scenarios that failed due to insufficient description while the code is fine. Optionally, the step of identifying the test scenarios that failed due to the insufficient description is performed by a non-programmer user. In step 634, identifying the test scenarios that failed due to code error. Optionally, the step of identifying the test scenarios that failed due to code error is performed by a non-programmer user. In step 636, re-recording, by a non-programmer user on a data-oriented large-scale software system, the test scenarios that failed due to the insufficient description while the code is fine. And in step 638, forwarding to a programmer for code change the test scenarios that failed due to code error. Optionally, a non-programmer user identifies test scenarios that failed with an abnormal termination as test scenarios that failed due to code error, wherein abnormal termination does not include normal termination with a value different from an expected value. Optionally, a non-programmer user identifies test scenarios that do not result in predefined expected values as test scenarios that were failed due to the insufficient description while the code is fine.

Figure 6D:
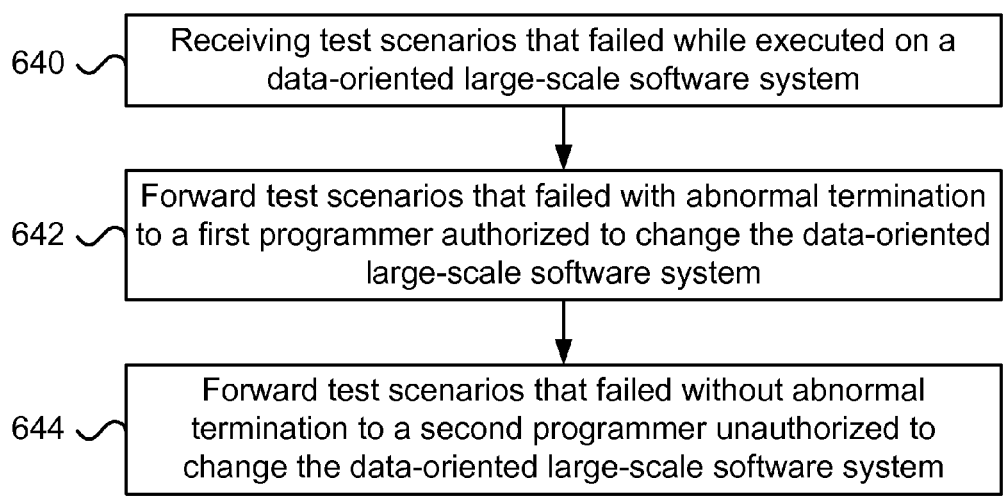
FIG. 6D illustrates one embodiment of a method for automatic authorization-based routing of failed test scenarios.

FIG. 6D illustrates one embodiment of a method for automatic authorization-based routing of failed test scenarios. The method comprising the following steps: In step 640, receiving descriptions of test scenarios that failed while executed by an automatic testing component on a data-oriented large-scale software system; wherein at least 50% of the test scenarios are expressed by user interaction activities and not code-related language. In step 642, identifying the test scenarios that failed with abnormal termination as test scenarios to be forwarded to a first programmer authorized to change the data-oriented large-scale software system; wherein abnormal termination does not include normal termination with a value different from an expected value. And in step 644, identifying the test scenarios that failed without abnormal termination as test scenarios to be forwarded to a second programmer unauthorized to change the data-oriented large-scale software system.

In one embodiment, the system tries to execute available parametric test scenarios 104 automatically. If the system succeeds, it provides a completion report 152 and exists. If the execution of the parametric test scenarios 104 fails, the system sends to the non-programmer user 100 a message describing the test scenarios that have to be run manually and/or re-recorded (referred to as need to fix report 154). If the non-programmer user 100 decides that the parametric test scenario 104 failed due to a code error, the parametric test scenario 104 is forwarded to a programmer for fixing, and then the system tries executing the fixed parametric test scenario 104 again. Optionally the process repeats until the parametric test scenario 104 runs successfully. If the non-programmer user 100 decides that the parametric test scenario 104 failed due to a business process change, and/or due to poor representation of the test scenario, the non-programmer user 100 updates the parametric test scenario 104 by re-recording the test scenario. Then, the system tries executing the updated parametric test scenario 104 again. Optionally, the process repeats until the parametric test scenario 104 runs successfully.

The parametric test scenarios 104 may be executed periodically, and especially when the organization-specific in-use software elements are modified or upgraded. The automatic testing component 150 may test the system seamlessly, and request a user intervention only upon unsuccessful execution of a parametric test scenario 104, optionally resulting from a bug or a business process change.

FIG. 1C illustrates a variation of the system illustrated in FIG. 1A, where the parametric test scenarios 104 are executed manually 150'. Test list 130' describes the testing program for the manual execution, completion report 152' describes the successfully completed tests, and need to fix report 154' describes the failed tests.

Test recording and analysis component 102.

In some embodiments, a non-programmer user 100 records a test scenario on an old installation, and the test recording and analysis component 102 converts the recording to a parametric test scenario 104 able to be executed on the new installation. In some embodiments, the parametric test scenario 104 comprises two corresponding documents. The first is a parametric test scenario repairable by a non-programmer user, which enables the non-programmer user 100 to execute and re-record the test scenario manually. The second is a coded parametric test scenario, which is used by the automatic testing component 150 for automatic execution of the parametric test scenario 104.

Figure 4:
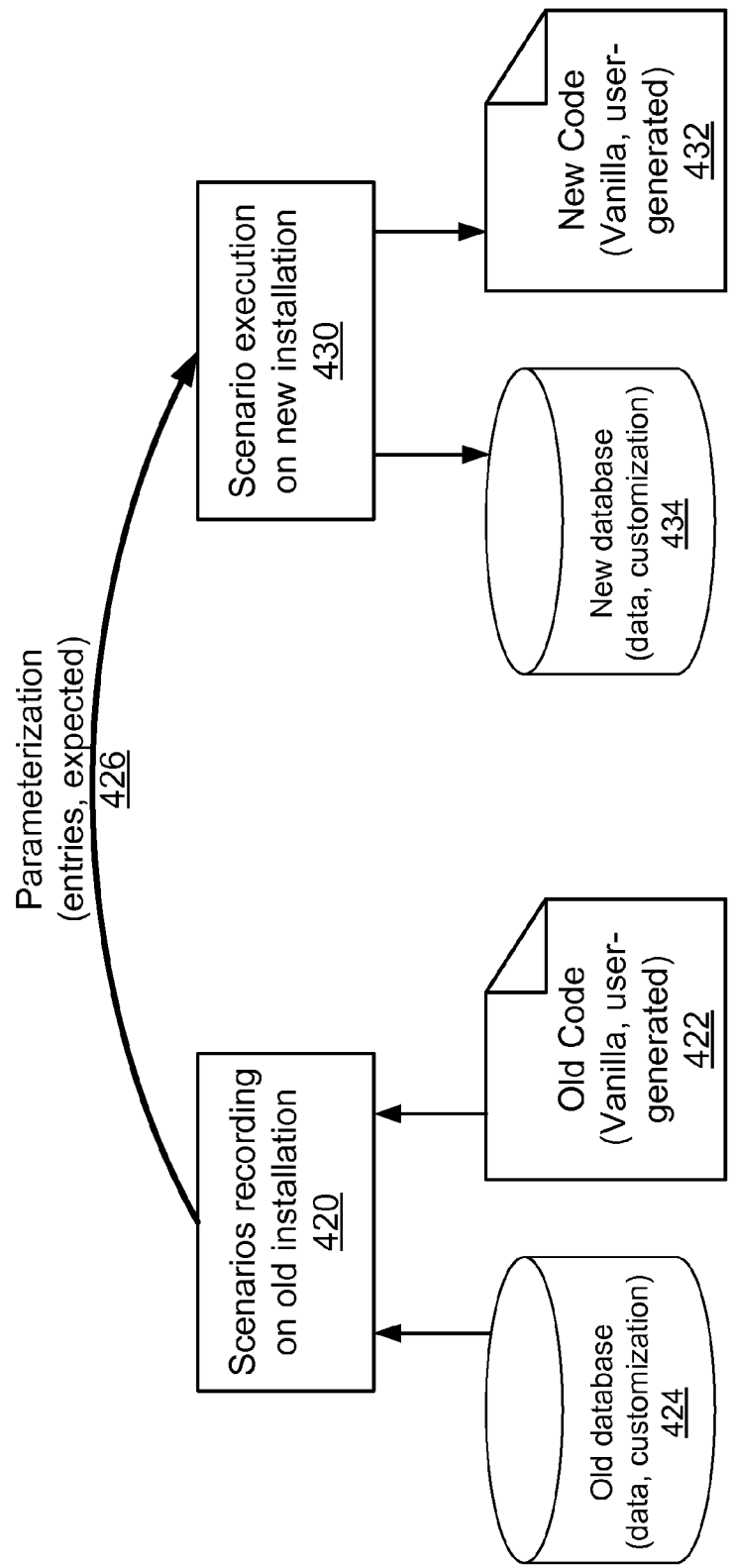
FIG. 4 illustrates one embodiment of a record and play process.

FIG. 4 illustrates one embodiment of a record and play process. A scenario is recorded on an old installation 420. The recording reflects the old code 422 (including old vanilla code and old user-generated code) and the old database 424 (including old data and old customizations). Because the code of the new installation 432 and the database of the new installation 434 are different from the code of the old installation 422 and the database of the old installation 424, the recorded scenario is parameterized 426 into a parametric test scenario 104 comprising parametric entries, which describe the values to be entered, and parametric expected values, which describe the predicted results. Then, the parametric test scenario 104 is executed on the new installation 430 by a program that interacts with the code of the new installation 432 (including new vanilla code and new user-generated code) and the database of the new installation 434 (including new data and new customizations), which may be quite different from the code and database of the old installation.

Referring again to the definition of "parametric test scenario repairable by a non-programmer user", in some embodiments, some of the parametric test scenarios 104 would fail when played on an upgraded release and/or on other installations. And because the test scenario pseudocode is written with expressions that substantially conform to the user's work environment, the non-programmer user is expected to be able to repair many of the failures manually. The ability to repair the failures provides a great advantage over cases where the non-programmer user does not understand the parametric test scenario documentation, and therefore cannot usually repair the test scenario.

In one embodiment, the automatically generated parametric test scenario repairable by a non-programmer user provides clear distinction between values to be entered, field labels, and procedure calls in order to improve its readability. In another embodiment, the automatically generated parametric test scenario repairable by a non-programmer user distinguishes between entry values and expected values in order to sift out irrelevant data from the test scenario document. For example, the user selects a customer (entry value), and then the system pops up the default parameters of that customer (expected values). In this embodiment, the parametric test scenario repairable by a non-programmer user guides the user as to which values to enter, and may inform the user of the expected values resulting from the entered value. On the other hand, a parametric test scenario that is irreparable by a non-programmer user (such as an application showing mere screen shots) would show the user both the entry values and the expected values with no distinction.

The ability to execute, on the new installation, recordings of test scenarios taken on the old installation, provides a great unobvious advantage at least because (i) the non-programmer user 100 is well familiar with the old installation, while may not be familiar with the new installation; (ii) the old installation is assumed to operate well, while the customizations made to the new installation are assumed to have bugs; and (iii) some of the originally recorded values do not fit new installation.

In addition, the ability to generate automatically the parametric test scenarios 104 from recordings provides a significant advantage due to some or all of the following benefits: the scenarios can be recorded by users, such as business analysts or business process experts, having no programming/engineering partners; there is almost no need for technical skills because recording a scenario does not require scripting, parameterization, or modularization; and there is no need to document the recording manually when the system automatically generates human readable parametric test scenarios from the recordings.

In one example, the test recording component 102 records one or more of the following data while the user normally runs a business process: executed transactions, sequence of screen inputs, issued messages, outputs to user interface, database activities, and/or objects involved in a certain transaction.

In some embodiments, the ability to generate a parametric test scenario 104 automatically, and specifically a parametric test scenario repairable by a non-programmer user, is based on dynamic analysis, understanding of the work environment, and static analysis.

The dynamic analysis traces and analyzes the script produced in run-time by the recording tool. Optionally, the script produced in run-time is sent to a designated server not in the premises of the end-user.

Understanding of the work environment enables automatic generation of a parametric test scenario repairable by a non-programmer user that is: (a) expressed in terms that substantially conform to the terms used in the user's work environment, and (b) coherent with the actual manual operation of the test scenario. The result is a user-friendly document that, for example, includes the field labels that the user is used to work with, requires the user to enter the entry values, but at least most of the times does not require the user to enter the expected values.

Static analysis (also known as "impact analysis") identifies the logical entities associated with the entered values, identifies the relationships between the logical entities, identifies the relationships and dependencies between the different business processes, and identifies the relationships between the different software elements. These identified relationships are used to convert values in the recorded test scenarios to variables. And because the variables can receive values other than the recorded values, the parametric test scenario may still be able to run on a different installation, and/or assist the user in repairing the test scenario. For example, two environmental changes that may affect the execution of a previously recorded test scenario include a data change (such as when the original input is currently invalid), and/or operation over different installations. In one numerical example, a user records a scenario with a customer whose ID is 1234. After upgrading the system to a newer release, customer 1234 is no longer available, and thus the recorded test scenario cannot run as is. However, the static analysis identifies the value 1234 as a customer ID number and selects a different value for the customer ID number, for example by extracting an alternative valid customer number from a database, guessing another customer ID, or trying substituting customer ID used in other scenarios. A similar example includes a change to an element name/property, etc.

In one embodiment, a method for automatic generation of test scenarios with expected behavior from recordings, comprising the following steps: (i) Recording a user entering a test scenario, wherein most of the user activities required for the recording are substantially the same as end-user activities. (ii) Analyzing the recording using dynamic analysis and domain knowledge. (iii) Inferring expected results from the recording and domain knowledge, optionally using static analysis. And (iv) Generating from the recording a test scenario repairable by a non-programmer user.

Improving the ability to execute, manually or automatically, a parametric test scenario 104.

The ability to execute a parametric test scenario 104 is usually limited to the logic and type of data exposed by the information used to create the parametric test scenario 104. Various recordings of the same scenario may provide additional information necessary for certain instances of the scenario. Various recordings of the same test scenario may be combined into a single parametric test scenario 104, or saved as a plurality of parametric test scenarios 104, each useful in a different instance of the scenario. For example, assuming a first recording of a certain test scenario is taken by a high-priority user who is not required to go through an authorization phase. As a result, execution of the resulting parametric test scenario 104, by a low-priority user, may fail because the authorization phase is undocumented. Consequently, a second recording of the certain test scenario, taken by a low-priority user who goes through the authorization phase, will provide the information necessary to document the instance of executing the test scenario by the low-priority user.

In one embodiment, the various test scenarios are stored essentially independently and a functioning test scenario is selected and executed based on the available conditions. For example, if a low-priority user executes the scenario, the parametric test scenario 104 generated from the second recording should be executed. Alternatively, all the various recordings are executed until one of them succeeds.

In another embodiment, information describing the various instances of the scenario, gathered from the various recordings, is integrated into a master parametric test scenario 104. Optionally, the integration is based on identifying the common denominator between the various recordings. Additionally or alternatively, the integration is based on integrating the different instances to a conditioned branched test scenario able to deal with variations that were not explicitly recorded.

In some embodiments, the master parametric test scenario 104 also includes instances that were not explicitly recorded and/or explicitly entered to the system. These instances are derived from combinations of the various instances. For example, a first recorded scenario including screen series (a, b, c, d, e) and a second recorded scenario including screen series (a, f, c, g, e) are analyzed. The analysis result may be that the screen series (a, b, c, g, e), which was not explicitly recorded, may also be legal because either screen d or g can follow screen c.

In some embodiments, a new installation may modify the logic of a business process associated with a parametric test scenario 104, and as a result, the execution of that parametric test scenario 104 may fail. In one embodiment, the non-programmer user 100 repairs the parametric test scenario 104 by re-recording the test scenario with the relevant changes that reflect the new process. The new recording is then used to update the old parametric test scenario, optionally automatically.

Optionally, there are a few related parametric test scenarios 104 incompatible with the new installation. In this case, when a non-programmer user 100 records a modification to a previously recorded parametric test scenario 104, the automatic testing component 150 checks whether a similar modification can be applied to the other related incompatible parametric test scenarios 104. Parametric test scenarios 104 are identified as related when including overlapping portions above a threshold. For example, more than 80% overlap in the screen flow, or more than 95% overlap in the order of accessing vanilla code procedures. The modifications may also be applied to unrelated parametric test scenarios as long as the modified sections are located in essentially equivalent subsections. Then, optionally, the system tries executing the modified parametric test scenarios 104 to verify correctness.

For example, a few scenarios related to the same business process were recorded on an old installation. After a system upgrade, the scenarios failed because of a newly added screen. However, the newly added screen may be common to at least some of the scenarios, thus enabling the system to apply substantially the same modifications to other scenarios having similar screen flows. In another example, a few scenarios, which were recorded on an old installation, share a common object. After system upgrade, the scenarios failed because the common object includes a new field. Therefore, after one of the transactions is fixed, e.g. by entering a value to the new field, the system tries applying substantially the same modification to the common object in the other transactions, e.g. by entering the same type of value to the new field.

In some embodiments, the automatic testing component 150 tries handing failures by drawing lots or making smart guesses based on the type of the new or modified elements, known conditions, or known relationships. For example, after system upgrade, a scenario fails because it includes a new field. So the automatic testing component 150 tries substituting different values retrieved from the database based on relationships between the new field and the database (for example, a drop-down list is connected to a database table); based on relationships between the new field and other known fields (for example, new field X should receive the value of field Y times a certain gain); and/or based on the type of the new field's data, such as a date. In another example, proper values are guessed and the test scenario is potentially executed until one of the tests results in a successful run.

In some embodiments, each parametric test scenario 104 comprises two corresponding documents (i) a parametric test scenario repairable by a non-programmer user, for example to be used by the non-programmer user 100; and (ii) a corresponding coded parametric test scenario, for example to be used by the automatic testing component 150 for running the parametric test scenarios 104 on different installations and/or with different data. Examples of various logics that enable automatic execution of the parametric test scenarios 104 are described hereinbelow.

(a) The parametric test scenarios repairable by a non-programmer user and the corresponding coded parametric test scenarios may include different data. For example, for each scenario, the parametric test scenario repairable by a non-programmer user may include the transaction number and screen number only once, while the coded parametric test scenario may include duplications of that data. The duplications may assist queries such as a query designed to ascertain which specific steps in the test scenarios are to be affected by a change to a specific screen in a specific transaction. The parametric test scenario repairable by a non-programmer user may also include comments in natural language that do not appear in the corresponding coded parametric test scenario.

(b) Time dependency of a field, such as a future value, a past value, or a specific time interval.

(c) Back-off value assignment logic that tries substituting alternative values in case of failure. For example, the automatic testing component 150 tries substituting a first value from a list of suppliers into a parameter describing a supplier in a parametric test scenario 104. If the test scenario fails, the automatic testing component 150 tries substituting an alternative supplier value from the list into the parameter in the parametric test scenario 104 and then tries running the parametric test scenario 104 again, optionally until one of the executions succeeds or a predetermined number of attempts is reached. In another example, the automatic testing component 150 tries substituting a first future date into a parameter describing a future date in the parametric test scenario 104. If the test scenario fails, the automatic testing component 150 tries substituting an alternative future date and then tries running the parametric test scenario 104 again, optionally until one of the executions succeeds or a predetermined number of attempts is reached.

(d) In some embodiments, dynamic analysis and/or static analysis determine the values to be substituted into the parameters of the parametric test scenario 104 based on preconditions. The preconditions may be inferred from the recordings and/or from the transaction code itself. Examples for inferring preconditions by identifying relationships between software elements using dynamic analysis include: (i) a user runs a query and then enters the result into a field; the dynamic analysis identifies the relationship between the two software elements; identifies the table in the database from which the value is extracted; and set the field to receive a value selected from that table. (ii) a user enters a value into a field; the dynamic analysis identifies a relationship between the entered value and a correlated software elements of the same type that is associated with the same transaction, such as a future date (associated with the date of executing the transaction), or payment with commission (associated with an invoice on the same currency issued a few steps behind); identifies the origin of the correlated software element, such as a certain table in the database, or the result of a certain calculation; and set the field to receive a value selected from that table or calculation. Other examples for inferring preconditions by analyzing the transaction or business process code, optionally using static analysis, include: (i) inferring the precondition from a calculation made on a required field. For example, when the static analysis determines that the transaction code checks whether a certain filed value represents a future date or a natural number, it is reasonable to infer that the certain field should receive a future date or a natural number. And (ii) when the static analysis determines that the transaction code verifies that a certain filed value appears on a certain table in the database, it is reasonable to infer that the certain field should receive a value selected from the certain table.

The automatic testing component 150 also has to analyze the execution outcome in order to determine its successfulness. In one embodiment, the automatic testing component 150 is based on the following three key issues: (i) Selecting valid input values. (ii) Overcoming run-time obstacles, such as warning messages and small changes in the system behavior resulting from changes in the data and/or system setup. And (iii) Determining execution result based on the significant outcomes. Some of the outcomes, such as the type of a previous screen, the type of a completion message, or the value of specific fields are more significant for determining the execution successfulness than other outcomes, such as the task's completion time and date, or the operator name.

In some embodiments, new test scenarios are generated as variations of functioning test scenarios that are executed semiautomatically. The use of functioning test scenarios as the basis of generating a new test scenario improves the work efficiency significantly and enables the non-programmer user to focus on the unique aspects of the new test scenario instead of rerecording known steps. The non-programmer user may change the semiautomatically entered data, may add new data to the basic functioning test scenario, may add new forms (also known as screens) to the basic functioning test scenario, and/or enter missing data. The user's interactions with the semiautomatic executed test scenario are recorded to generate the new test scenario.

The ability to add new forms to the basic functioning test scenarios is significantly important because it enables the non-programmer user to record new test scenarios that are not limited to trivial variations of the basic functioning test scenario. Using functioning test scenarios also provides a great advantage over variations generated, by the way, based on failed test scenarios. This is because when dealing with failed test scenarios, the non-programmer user is focused on fixing the failed test scenario, and usually the new test scenario will replace the failed test scenario. Contrary to failed test scenarios, selecting a functioning test scenario as the baseline improves the non-programmer user's confidence (because the functioning test scenario should operate well) and focuses the non-programmer user on generating new additional test scenarios, instead of fixing the available failed test scenario.

Generating a new test scenario based on executing a functioning test scenario semiautomatically.

Figure 7:
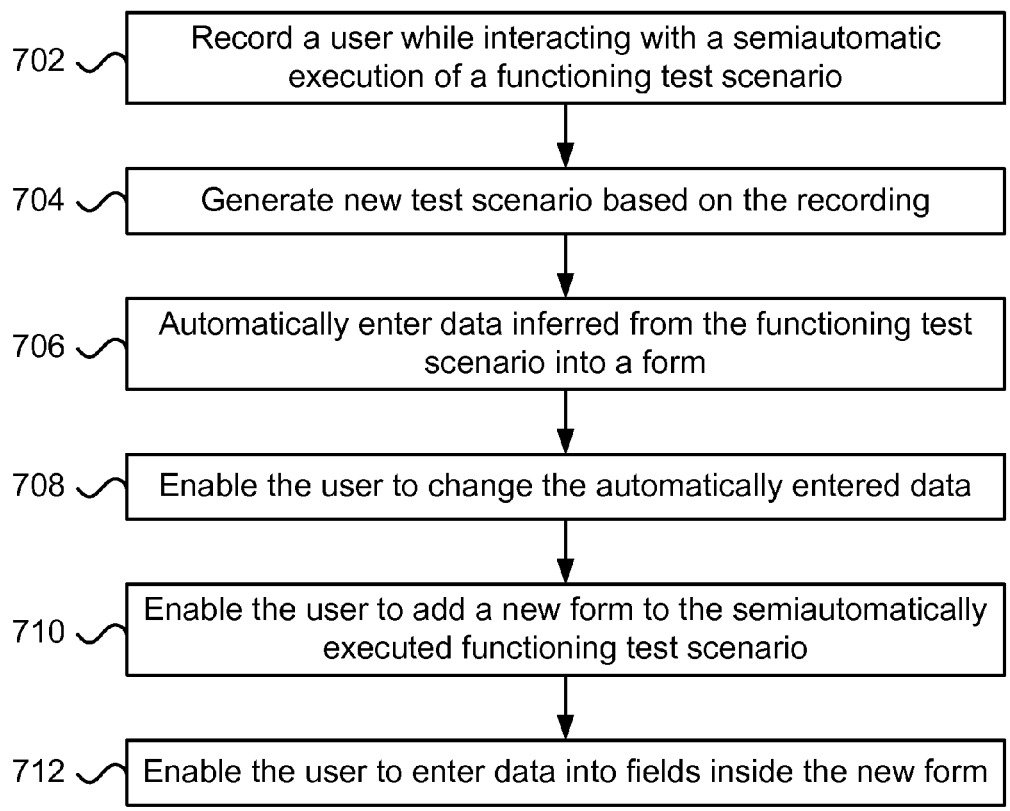
FIG. 7 illustrates one embodiment of a method for semi-automatic execution of a functioning test scenario to enable a non-programmer user to generate a new test scenario based on the functioning test scenario.

FIG. 7 illustrates one embodiment of a method for semiautomatic execution of a functioning test scenario to enable a non-programmer user to generate a new test scenario based on the functioning test scenario. The method comprising the following steps. In step 702, recording the non-programmer user while interacting with the semiautomatic execution of the functioning test scenario. And in step 704, generating the new test scenario based on the recording. Wherein the semiautomatic execution of the functioning test scenario enables the following features via the following steps. In step 706, automatically entering data inferred from the functioning test scenario into a form of a data-oriented large-scale software system. In step 708, enabling the non-programmer user to change the automatically entered data and registering at least one change to the automatically entered data. In step 710, enabling the non-programmer user to add a new form to the semiautomatically executed functioning test scenario, and registering at least one new added form. And in step 712, enabling the non-programmer user to enter data into fields inside the new form, and registering the data entered to at least one field inside the new form. Optionally, the method further comprises the step of comparing forms following the new form with available forms of the functioning test scenario, and automatically entering data inferred from the functioning test scenario into the following forms when there is a match. Optionally, the method further comprises the step of using dynamic analysis and domain knowledge for generating the new test scenario. Optionally, the method further comprises the step of using static analysis to infer expected results when generating the new test scenario. Optionally, the functioning test scenario and the new test scenario are test scenarios repairable by a non-programmer user. Optionally, the test scenarios repairable by a non-programmer user are parametric test scenarios repairable by a non-programmer user. Optionally, the new test scenario consists of the recorded forms. Optionally, the method further comprises providing a wizard to assist the non-programmer user in changing the automatically entered data. Optionally, the new test scenario is generated based on data gathered by the wizard. Optionally, the method further comprises enabling the non-programmer user to change the automatically entered data includes enabling the non-programmer user to complete missing data. Optionally, the semiautomatic execution of the functioning test scenario further marks automatically the fields having the missing data.

Figure 8C:
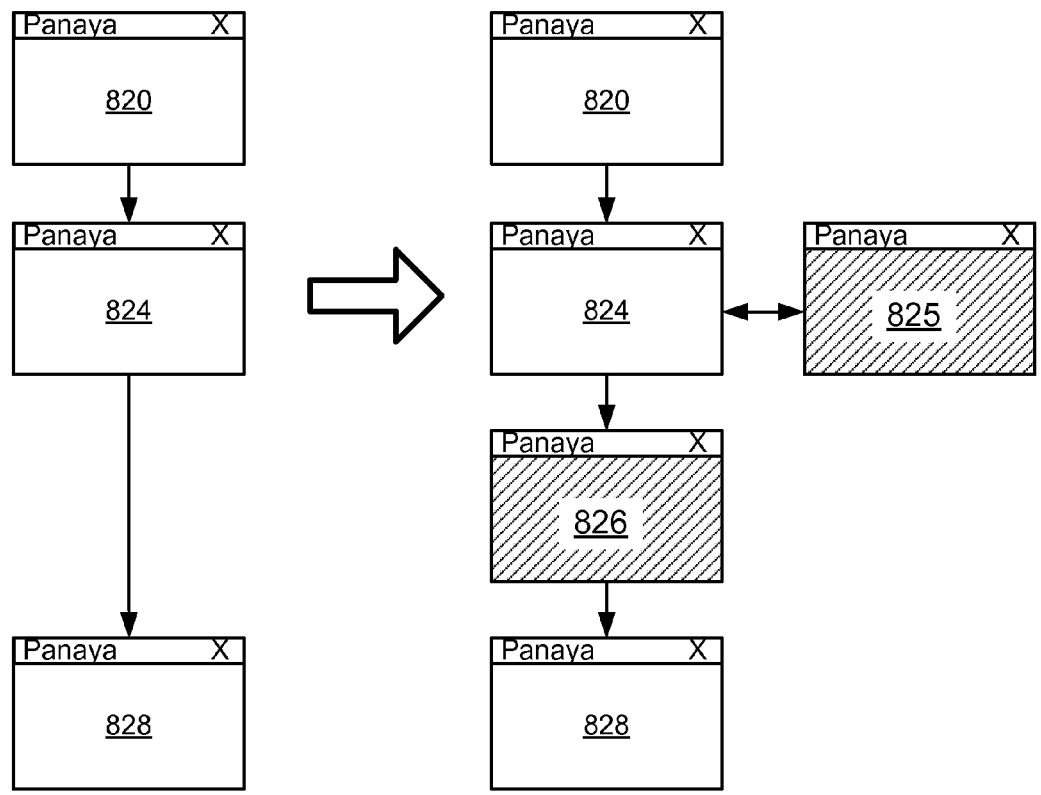

FIG. 8A, FIG. 8B, and FIG. 8C illustrate certain aspects of the method for semiautomatic execution of a functioning test scenario to enable a non-programmer user to generate a new test scenario based on the functioning test scenario, as described above in relation to FIG. 7.

Referring to FIG. 8A, screen 810 illustrates a semiautomatic execution of the functioning test scenario. The product model "55655" was inferred from the functioning test scenario and entered automatically into the form of the data-oriented large-scale software system. The semiautomatic program code enables the non-programmer user to change the automatically entered data, as illustrated in FIG. 8B, where the previous value "5565" was changed by the user to "44444". FIG. 8B also illustrated how the user added the credit card number "12345678", which is recorded and will be added to the new test scenario to be generated based on the recording.

FIG. 8C illustrates the ability to add a new form to the semiautomatically executed functioning test scenario. The functioning test scenario included only screens 820, 824, and 828. While using the original semiautomatic execution, and the user added screens 825 and 826, and thus the new test scenario that was generated based on the functioning test scenario now includes the two additional screens 825 and 826. The user may add data to the new screens in a similar manner to the credit card example of FIG. 8B.

In one embodiment, a method for updating a test scenario repairable by a non-programmer user based on semiautomatic execution of the test scenario, includes the following steps: (i) executing semiautomatically the test scenario repairable by a non-programmer user by automatically entering data inferred from the test scenario to a form. (ii) enabling a user to amend the automatically entered data. (iii) using, by an automatic test scenario generation engine, the user amendments to generate an updated test scenario repairable by a non-programmer. (iv) counting the number of user amendments to a certain field across different execution of the test scenario. And (v) after the user successively amends the certain field for predefined times (greater than two, and preferably greater than five), marking the certain field, by the automatic test scenario generation engine, as a known-to-be-wrong field. Optionally, the method further includes requesting a user to enter data manually to the known-to-be-wrong field. Optionally, the method further includes forwarding the known-to-be-wrong field to a programmer, whereby the programmer replaces the known-to-be-wrong field with a functioning parametric representation. Optionally, the predefined times for successively amending the certain field is at least 5 times; alternatively, the predefined times are at least ten times over at least ten successive executions of the test scenario.

Some scenarios may include optional screens and/or optional fields (for simplicity usually referred to as optional screens), which may or may not appear depending on various conditions. Examples of optional screens include authorization screen to approve a financial transaction above a certain threshold, additional signatures for a transaction executed by a junior user, various warnings of expected events or minor mismatches, and optional suggested supplements or sales depending on various preconditions. In one embodiment, the non-programmer user 100 identifies the optional screens while recording the test scenario using a wizard or by performing a predefined activity, such as using the keyboard, mouse or other data entry device, or combination thereof. In one example, the control button and right mouse click are used to select optional fields. In another embodiment, the optional screens are marked with a predefined text string on the parametric test scenario 104. In another embodiment, the recorded fields and screens are displayed to the non-programmer user 100, who identifies the mandatory screens and fields, or alternatively identifies the optional screens and fields.

FIG. 5A, FIG. 5B, and FIG. 5C illustrate three instances of the same scenario, which result in different screen flows. FIG. 5A illustrates the basic screens (510, 511, and 512). FIG. 5B illustrates the basic screens (510, 511, and 512), and optional screen 514. And FIG. 5C illustrates the basic screens (510, 511, and 512), and optional screen 516. FIG. 5D illustrates a master scenario including the various identified screens, where screens 514 and 516 are marked as optional screens. In one embodiment, a draft of the master scenario, and/or different instances of the scenario, are provided to a non-programmer user 100 for manual identification of the optional screens 514 and 516. In another embodiment, different instances of the same scenario are analyzed automatically or semi-automatically to identify the optional screens 514 and 516.

In some embodiments, parametric test scenarios 104 are generated from recordings of key-users while reducing the interactions with the key-users to a minimum, or even without notifying the key-users of the fact that their activities are recorded to generate parametric test scenarios 104.

One method for minimizing user interactions when recording scenarios for generating parametric test scenarios 104 includes the following steps: (i) Defining one or more key-users who supposed to operate the business processes to be tested. (ii) Recording the key-users while working, optionally essentially without affecting their usual course of work. (iii) Generating automatically parametric test scenarios 104 from the recordings. Optionally, the alternative instances of the same test scenario are aggregated into a master parametric test scenarios 104 having branches describing the different instances. (iv) Prioritizing the generated parametric test scenarios 104 based on the list of changed scenarios 126. And (v) executing the generated parametric test scenarios 104 on a different installation, according to the calculated prioritization, without bothering the key-users.

The method above enables the key-users to supply most of the information needed to create the parametric test scenarios 104. Optionally, the generated parametric test scenarios 104 are executed on a different installation by an automatic testing component 150. Optionally, failed parametric test scenarios 104 are forwarded to a non-programmer user 100, who is not the key-user that recorded the scenarios used to generate the failed parametric test scenarios 104. Moreover, the generated parametric test scenarios 104 may be executed on the different installation by a quality assurance (QA) user who is less familiar with the system relative to the key-user that recorded the scenarios used to generate the parametric test scenarios 104.

Improving user friendliness of a manual test scenario generated from recordings by removing unessential test steps.

In one embodiment, improving the user friendliness of a manual test scenario is expressed by reducing the number of fields described in the manual test scenario. Additionally or alternatively, improving the user friendliness of a manual test scenario may also be expressed in reducing the number of fields described in the manual test scenario.

Figure 9:
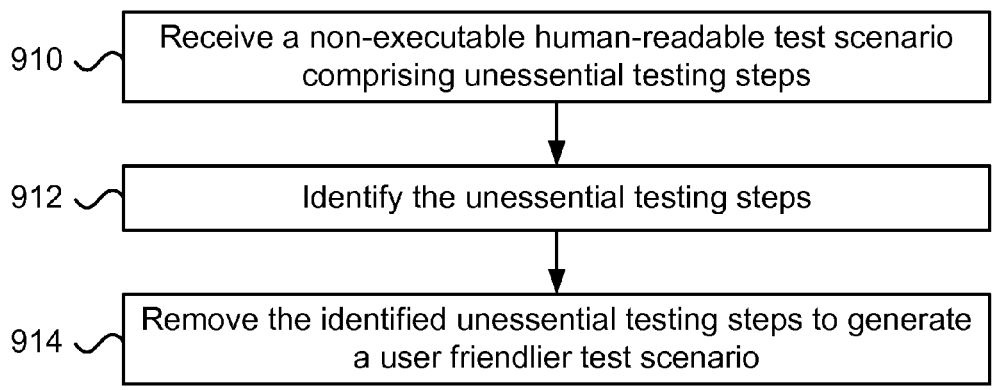
FIG. 9 illustrates one embodiment of a method for improving user friendliness of a non-executable human-readable test scenario by removing unessential test steps.

FIG. 9 illustrates one embodiment of a method for improving user friendliness of a non-executable human-readable test scenario by removing unessential test steps. The method comprising the following steps. In step 910, receiving a non-executable human-readable test scenario comprising unessential test steps. Optionally, the received non-executable human-readable test scenario was generated from a recording, and thus includes unessential test steps. In step 912, identifying the unessential test steps. And in step 914, generating a user friendlier non-executable human-readable test scenario by removing the identified unessential test steps. Optionally, a screen that does not return a value usable for its calling screen is identified as an unessential screen that generates unessential testing step. Optionally, a screen that can be replaced by its returned value without changing the main outcome of the test scenario is identified as an unessential testing step. Optionally, the text describing the steps related to the screen that can be replaced by the returned value is replaced with a request to insert the returned value. Optionally, the unessential test steps comprise a screen that returns a value that the user already should have known. Optionally, the unessential test steps comprise entry values identical to the default values. Optionally, all explanations related to default values are essentially removed from the user friendlier non-executable human-readable test scenario. Optionally, the unessential test steps comprise unproductive steps, which result in an error message, whereby a following successful variation of the unproductive steps is left in the user friendlier non-executable human-readable test scenario.

Figure 10A:
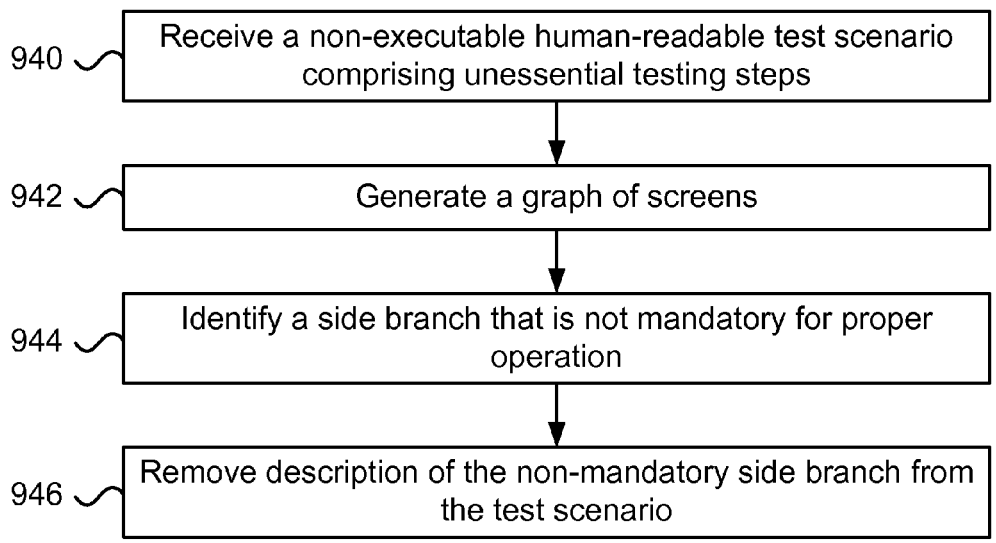
FIG. 10A and FIG. 10B illustrate one embodiment of a method for improving the user friendliness of a non-executable human-readable test scenario by removing unessential test steps.

FIG. 10A illustrates one embodiment of a method for improving the user friendliness of a non-executable human-readable test scenario, by removing unessential test steps. The method comprising the following steps. In step 940, receiving a non-executable human-readable test scenario comprising unessential test steps. Optionally, the received non-executable human-readable test scenario was generated from a recording. In step 942, generating a graph of screens that are referred to by the non-executable human-readable test scenario. In step 944, identifying a side branch that is not mandatory for the proper operation of the non-executable human-readable test scenario. Optionally, the non-mandatory side branch comprises a help screen. Optionally, the non-mandatory side branch comprises unproductive steps resulted in an error message. Optionally, the non-mandatory side branch provides a value identical to a default value. Optionally, the non-mandatory side branch is characterized by not changing the behavior of a business processes under test. And in step 946, removing the description of the non-mandatory side branch from the non-executable human-readable test scenario.

Figure 10B:
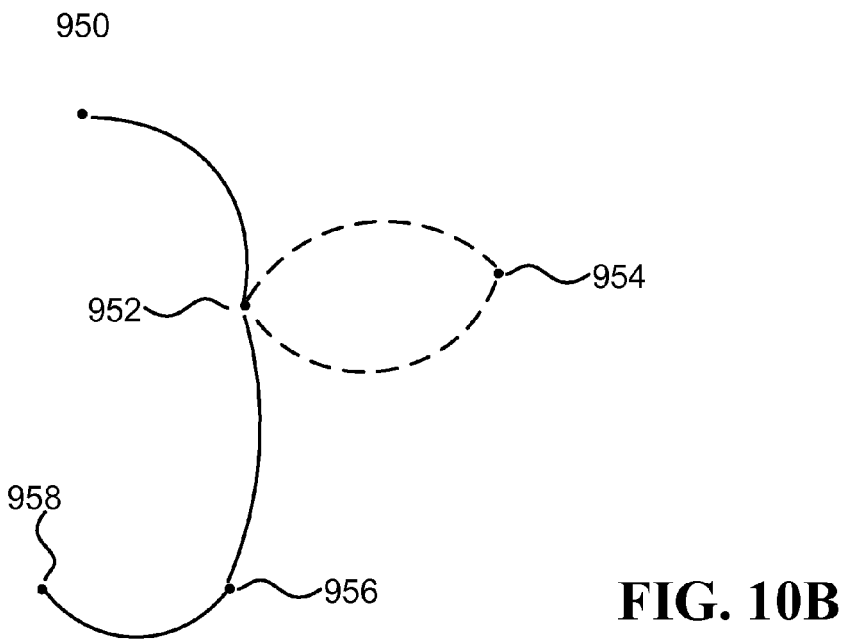

FIG. 10B illustrates the graph of screens already discussed above in FIG. 10A. The non-executable human-readable test scenario originally included screens 950, 952, 954, 956, and 958. However, screen 945 was identified as a side branch that is not mandatory for proper operation of the non-executable human-readable test scenario. Therefore, the description of the dashed line is removed from the non-executable human-readable test scenario.

Figure 11:
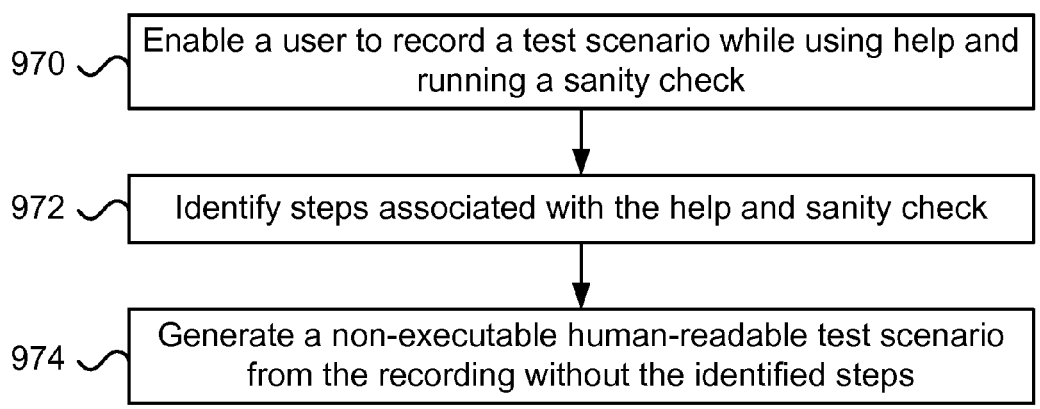
FIG. 11 illustrates one embodiment of a method for user-friendly test scenario recording.

FIG. 11 illustrates one embodiment of a method for user-friendly test scenario recording. The method comprising the following steps. In step 970, enabling a non-programmer user to record a test scenario on a data-oriented large-scale software system, while using help screen, and while running a sanity check that is not mandatory to the recorded test scenario and does not change the test scenario's outcome. In step 972, identifying steps associated with using the help screen and running the sanity check. And in step 974, generating a non-executable human-readable test scenario from the recording without the identified steps. Optionally, the step of generating a non-executable human-readable test scenario from the recording is executed before the step of identifying the steps associated with using the help screen and running the sanity check, and the identified steps are removed from the generated non-executable human-readable test scenario. Optionally, the method further comprises the steps of enabling the user, while recording, to exploit a screen that can be replaced by its returned value without changing main outcome of the test scenario, and generating the non-executable human-readable test scenario without the replaceable screen. Optionally, the method further comprises the steps of enabling the user, while recording, to enter values identical to default values, and generating the non-executable human-readable test scenario without the steps of entering the values identical to the default values.

In some embodiments, the parametric test scenarios 104 include a layered structure, and the process of updating an existing parametric test scenario 104 maintains these layers. Saving the parametric test scenarios 104 with layers enables the system to update the parametric test scenarios 104, while preserving the properties of at least some of the parameters, without having to run dynamic and static analyses in order to understand what each parameter is and what rules it obeys. For example, based on a parametric layer indicating that field X should receive a future date or that the value of field X is a function of the value of field Y, the automatic testing component 150 can enter to field X a current future date or the value of field Y without having to run static or dynamic analysis. Moreover, the updated test scenario may inherit the properties of the older test scenario, such as the importance of the test scenario and the list of the scenario's users.

Non-limiting examples of layers include: (i) Comments, such as comments by a programmer which do not appear on the transaction screen. (ii) Field properties, which may be identified from previous analyses, such as a future date, current date, version of the tested software release, and/or version of the test scenario. The field properties enable the automatic testing component 150 and/or a human tester to select the right value to be substituted into the field even when the parametric test scenario 104 is executed on an installation different from the installation on which it was recorded. (iii) Transaction and screen number relative to each text block (for cases where each scenario is related to a transaction, and each transaction has multiple screens). In one embodiment, the transaction number appears in multiple places in the parametric test scenario 104, and after a change, all the other occurrences are updated automatically. In one embodiment, the layer of the transaction and screen numbers for each text block are utilized to locate all the tests affected by a screen/transaction change. For example, a change is made, impact analysis identifies the numbers of the affected transactions and screens, then these numbers are located at the parametric test scenario 104, and a user is asked to fix the specific locations in order to be able to run the tests properly.

In some embodiments, additional information required for executing a parametric test scenario 104 is obtained using a combination of scenario recordings followed by focused wizard-aided queries, according to the following method steps: (i) Recording a scenario, optionally by a non-programmer user 100. (ii) Generating a parametric test scenario 104 from the recorded scenario. Alternatively, the parametric test scenario 104 is generated by a test engineer or by a wizard-based software. (iii) Executing the parametric test scenario 104 manually or by the automatic testing component 150. And (iv) Upon encountering an execution failure, fixing the failed test scenario by receiving from a human operator additional information related to the failure using a wizard.

When possible, the wizard suggests the human operator the possible values, dependencies, preconditions, preferences, or logic for each relevant field or activity, and the human operator indicates the suitable description aimed to solve the execution failure. Optionally, the information related to the failure is received from a non-programmer user 100 that defines at least the problematic fields, for example, by indicating a valid subset of values suiting the specific instance of the test scenario, by indicating a dependency, and/or by indicating the relevant ratio or calculation to achieve the right value.

The combination of generating a parametric test scenario 104 from the recorded scenario and then adding additional information using the wizard simplifies the process of generating a complex parametric test scenario 104 because the user uses the wizard mostly to add information related to the failure and/or complicated parts, and not for creating the entire parametric test scenario 104. In one example, the wizard is used to gather less than 20% of the total information available in the parametric test scenario 104. And optionally, the remaining at least 80% of the information is derived from one or more recordings of the test scenario, which did not involve the wizard.

In another example, the end-user activities are recorded, optionally without informing the end-user of the recording. Then the test recording and analysis component 102 generates parametric test scenarios 104. Optionally, the generated parametric test scenarios 104 are executed by the automatic testing component 150, and the need to fix tests 154 are provided to a non-programmer user 100 that enters the missing information using a wizard. In one embodiment, the data extracted from the recordings is presented by the wizard as the default value. This example shortens the time to complete the wizard because plain recording requires significantly less time than interacting with the wizard.

Formulating results of code change analysis according to in-use scenarios.

In one embodiment, a method for prioritizing a task plan comprising results of code change analysis according to organization-specific in-use scenarios, comprising the following steps: (i) Receiving an old code version and a new code version of a non organization-specific data-oriented large-scale software system. (ii) Running code change analysis to identify code elements in the old code version that were changed in the new code, referred to as changed code. (iii) Running code-to-scenarios analysis to identify scenarios that use the changed code, referred to as changed scenarios. Wherein the code-to-scenarios analysis also analyzes scenarios that are not in-use by the organization, and therefore some of the scenarios identified by the code-to-scenarios analysis are not in-use by the organization. (iv) Prioritizing a test plan for the changed scenarios based on the organization-specific in-use scenarios, such that changed scenarios that are identified as in-use scenarios receive a higher priority. Wherein the organization-specific in-use scenarios refer to scenarios that are actually executed by the specific organization. Optionally, the test plan prioritization is proportional to the amount of code changes relevant to each scenario. And optionally, the test plan prioritization is proportional to the weight of the corresponding in-use scenarios.

In one embodiment, at least some of the scenarios analyzed by the impact analysis are received from the manufacturer documentation and/or based on data gathered from other organizations. In another embodiment, the impacted scenarios are achieved by one or more of the following methods: (i) Using a scenario to code mapping, which may be received from run time logging that registers the used code elements in different level, such as transactions, procedures, and code lines. (ii) Using scenario to transaction mapping, and then transaction to code mapping, wherein the code related to the transactions is compared with the impacted code identified by the impact analysis.

Generating task plan for fixing and testing user-generated code according to changes in non organization-specific code.

In one embodiment, a method for prioritizing a task plan comprising fixing user-generated code tasks according to organization-specific in-use scenarios, comprising the following steps: (i) Receiving an old code version and a new code version of a non organization-specific data-oriented large-scale software system. (ii) Running code change analysis to identify code elements in the old code version that were changed in the new code, referred to as changed code. (iii) Running code analysis to identify user-generated code that needs to be fixed to suit the new code version. (iv) Running code-to-scenarios analysis to identify scenarios that use the user-generated code to be fixed, referred to as impacted scenarios. (v) Accessing a list of organization-specific in-use scenarios. (vi) identifying the intersection of the impacted scenarios and the organization-specific in-use scenarios. And (vii) generating a task plan that focuses a tester on testing the identified intersection by mainly presenting the fixing prerequisites for testing the identified intersection. Optionally, the task plan includes tests for various impacted scenarios having different prerequisites, and the prerequisites are used to indicate essentially the earliest time to test each impacted scenario without having to potentially repeat the test. Optionally, the task plan prioritization is proportional to the amount of code changes relevant to each scenario. Optionally, the task plan prioritization is proportional to the weight of the corresponding in-use scenarios. Optionally, the task plan comprises high priority tasks and low priority tasks, and mainly presenting the fixing prerequisites for testing the identified intersection means that more than half of the high priority tasks relate to the identified intersection. And optionally, focusing the tester on testing the identified intersection means that most of the highest priority tasks relate to the identified intersection.

Similar to the above method, the following method formulates results of code change analysis according to organization-specific in-use transactions, instead of scenarios. The method comprising the following steps: (i) Receiving an old code version and a new code version of a data-oriented large-scale software system. (ii) Running code change analysis to identify code element in the old code version that were changed in the new code, referred to as changed code. Optionally, the changed code comprises the procedures that include the code that is different between the two versions. Optionally, the changed code comprises code impacted by replacing the old code version with the new code version. (iii) Running code-to-transactions analysis to identify transactions that use the changed code, referred to as impacted transactions. Wherein the code-to-transactions analysis also analyzes transactions that are not in-use by the organization, and therefore some of the transactions identified by the code-to-transactions analysis are not in-use by the organization. (iv) Comparing the organization-specific in-use transactions with the impacted transactions to identify organization-specific in-use transactions that utilize at least some of the impacted code. Optionally, the transactions that utilize the impacted code are transactions that can execute the impacted code on the old code version according to a certain run-time analysis. Optionally, the transactions that utilize the impacted code are transactions that can contain the impacted code according to static analysis of the old code version. Optionally, the organization-specific in-use transactions refer to transactions that are actually in-use by the specific organization. And (v) increasing prioritization assigned to changed code that is utilized by the organization-specific in-use transactions.

According to another embodiment, a method for sorting changed code according to organization-specific in-use scenarios, and without using impact analysis, comprising the following steps: (i) Receiving an old code version and a new code version of a data-oriented large-scale software system. (ii) Identifying code element in the old code version that were changed in the new code, referred to as changed code. (iii) Identifying the changed code that is executed by the organization-specific in-use scenarios. Wherein the organization-specific in-use scenarios refer to scenarios that are actually in-use by the specific organization. And (iv) Marking the changed code that is executed by the organization-specific in-use scenarios as more error-prone than changed code that is not executed by the organization-specific in-use scenarios.

According to still another embodiment, a method for formulating results of code change analysis according to available parametric test scenarios, directly without using intermediate changed scenarios, comprising the following steps: (i) Receiving an old code version and a new code version. (ii) Identifying code impacted by replacing the old code version with the new code version. (iii) Analyzing available parametric test scenarios for identifying the parametric test scenarios that utilize at least some of the impacted code. Wherein the parametric test scenarios describe how to execute test scenarios and how to evaluate the execution outcomes. And (iv) Increasing prioritization assigned to impacted code that is utilized by the parametric test scenarios.

Risk Assessment.

In order to estimate software reliability from test data, test cases have to resemble the operational usage of the software. Allocation of the test scenarios plays an important role in estimating software reliability, where the better the allocation of test scenarios, the better the level of input coverage. Test scenarios based on operational usage are sometimes known as operation-based testing, which is a type of usage-based statistical testing.

Software needs to be tested extensively before it is considered dependable and trustworthy. To guide testing, software developers often use an operational profile, which is a quantitative representation of how a system is used. One way of ensuring that the most used functions of a system are tested is achieved by documenting user inputs and their occurrence probabilities in a given operational profile. Test cases can be generated directly from such an operational profile. Operational profiles are also a necessary part of quality-of-service prediction methods for software architectures, because these models have to include user inputs into their calculations.

In some embodiments, methods for risk assessment are designed to reduce the time and resources required to test software updates and upgrades. The risk assessment methods focus the tests on routines having higher probability to generate bugs, and optionally assist in creating software test scenarios to test these routines. In some embodiments, the higher probability to generate bugs results from adding user-generated code to and/or customizing parts of a data-oriented large-scale software system, such as SAP ERP or Oracle ERP, to the needs of a specific organization. In these embodiments, the method may prompt the user to test mainly the organization-specific in-use software elements, which are the relevant software elements for the specific organization. In other embodiments, the data-oriented large-scale software system is upgraded, therefore requiring the specific organization to re-test its use of the complex software platform along with its user-generated code.

Figure 12:
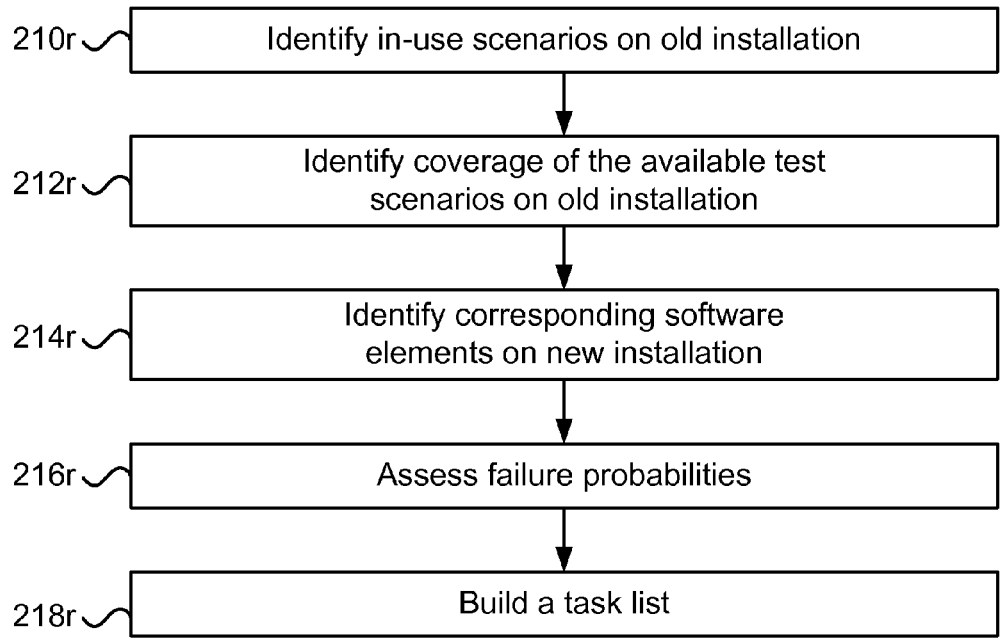
FIG. 12 illustrates one embodiment of a method for directing the users as to what software modules need to be checked when facing a code change.

FIG. 12 illustrates one embodiment of a method for directing the users as to what software modules need to be checked when facing a code change, such as an upgrade from an old installation to a newer installation, using the following steps.

In step 210*r*, identifying scenarios in-use by a specific organization. The in-use property may be binary (e.g. in-use or not in-use), or may be weighted according to the scenario's importance (e.g., not in-use scenario, low importance in-use scenario, medium importance in-use scenario, and high importance in-use scenario). In one embodiment, the scenarios in-use by the specific organization are identified based on registration of prior system usage on the old installation of the specific organization. Step 210*r* also identifies the organization-specific in-use software elements. In another embodiment, the scenarios in-use by the specific organization are estimated based on usage of equivalent scenarios by similar organizations, where similar organizations include organizations in the same field of operation, organizations running similar mixture of business-processes, and/or organizations having similar customization data structures that define the business processes.

In one example, a method for identifying scenarios in-use by a first organization based on similarity, comprising the following steps: identifying a second organization similar to the first organization; deciding which of the parametric test scenarios that are in-use by the similar organization are relevant to the specific organization; and looking for equivalent parametric test scenarios. Optionally, the first and second organizations are in the same field of operation. Optionally, the overlapping of the business-processes run by the first and second organizations is more than 80%.

In step 212r, identifying business processes covered by parametric test scenarios available for the old installation. Optionally, step 212r assumes the available parametric test scenarios cover scenarios important to the specific organization. Step 212r also identifies the organization-specific in-use software elements that are tested by the available parametric test scenarios. In one embodiment, the available parametric test scenarios for the old installation are parametric test scenarios repairable by a non-programmer user.

In step 214r identifying on the new installation (after the code change/software upgrade), by a component equivalent to code-to-scenario component 125, the organization-specific in-use software elements used by the in-use scenarios of step 210r and the tested-processes of step 212r. The modules may be identified by comparing the old and new installations. In one embodiment, the comparison mainly includes comparing the names of the vanilla code procedures, because an upgraded software release usually maintains the procedure names of its previous release. In another embodiment, the comparison compares the screen flows and when the overlapping passes a threshold—the scenarios are identified as corresponding scenarios. In still another embodiment, the comparison includes a control flow analysis that receives entry point and identifies the accessed vanilla code elements using techniques such as dead code analysis or dynamic resolving.

In step 216r, assessing failure probability of the organization-specific in-use software elements from step 214r. In one embodiment, it is assumed that (i) software elements without user-generated code would not produce bugs, and (ii) software elements with user-generated code would produce bugs.

In some embodiments, a software element (which may be for example a program object, a procedure, a class, or a library) is considered to include a user-generated code when it has been changed or had one or more attributes altered.

In another embodiment, a software upgrade process is analyzed to identify the software elements affected by the upgrade process and assess the failure probability of the affected software elements, using the following assumptions: (i) software elements unchanged by the upgrade process, which do not include user-generated code, would not produce bugs; (ii) software elements changed by the upgrade process, which do not include user-generated code, have a small probability to produce bugs; (iii) software elements unchanged by the upgrade process, which include user-generated code, have a significant probability to produce bugs; and (iv) software elements changed by the upgrade process, which include user-generated code, have a high probability to produce bugs.

In some embodiments, the software elements affected by the upgrade process are identified using impact analysis, also known as static code analysis. Then, static code analysis is used to identify the transactions and/or business processes using the affected software elements.

In still another embodiment, the failure probability of a business process is determined based on the existence or inexistence of previously reported bugs in the business process by users of the specific organization and/or by users from other organizations running the same business process. Optionally, the more bugs reported for a business process, the higher its failure probability. The previously reported bugs may be extracted from a failure-reporting logger, from a quality center, or from any other historical data logger. Optionally, this embodiment assumes that software elements changed by the upgrade process, which do not include user-generated code, may have a significant probability to produce bugs. In one example, after an upgrade it is assumed that all code, including unchanged vanilla code is susceptible to bugs.

In still another embodiment, the failure probability of a business process is determined based on its dependency on other business processes. For example, the more business processes depending on a specific business process, the higher the failure probability of the specific business process. Optionally, this embodiment also assumes that software elements changed by the upgrade process, which do not include user-generated code, may have a significant probability to produce bugs.

In one embodiment, the risk of each scenario is calculated by summing the failure probabilities of the software elements it operates on the new installation. Alternatively, the risk is binary and the scenario is considered to have a high risk if one of more of its software elements is estimated to have a high failure probability; the scenario is considered to have a low risk if none of its software elements is estimated to have high failure probability. Alternatively, the risk is calculated based on the number and/or type of users that use the scenarios, and the risk associated with frequently used scenarios is increased.

Figure 13:
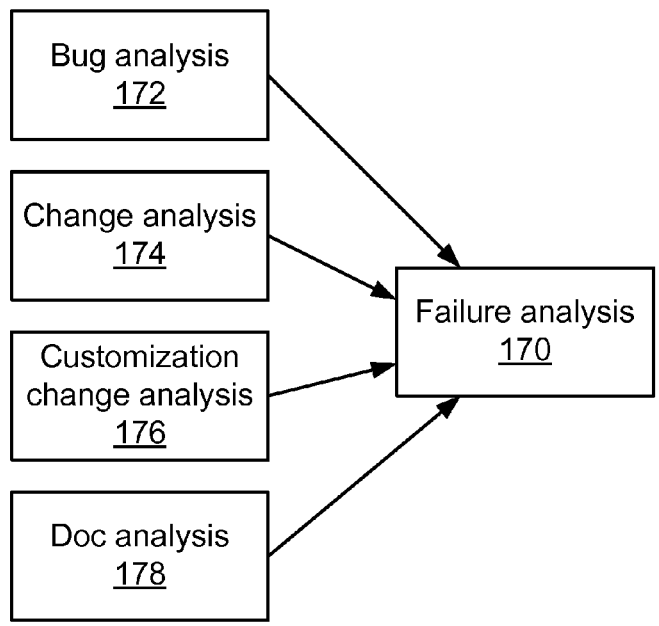
FIG. 13 is a schematic illustration of a failure analysis component.

FIG. 13 is a schematic illustration of a failure analysis component 170, which may include a bug analysis component 172 that registers open and closed bugs, a change analysis component 174 similar to the code change analysis component 124, a customization analysis component 176 based on static impact analysis on the code that read the customization and/or dynamic analysis of recordings, and a document analysis component 178. In some embodiments, the output of the failure analysis component 170 also includes the list of changed scenarios 126.

Figure 14:
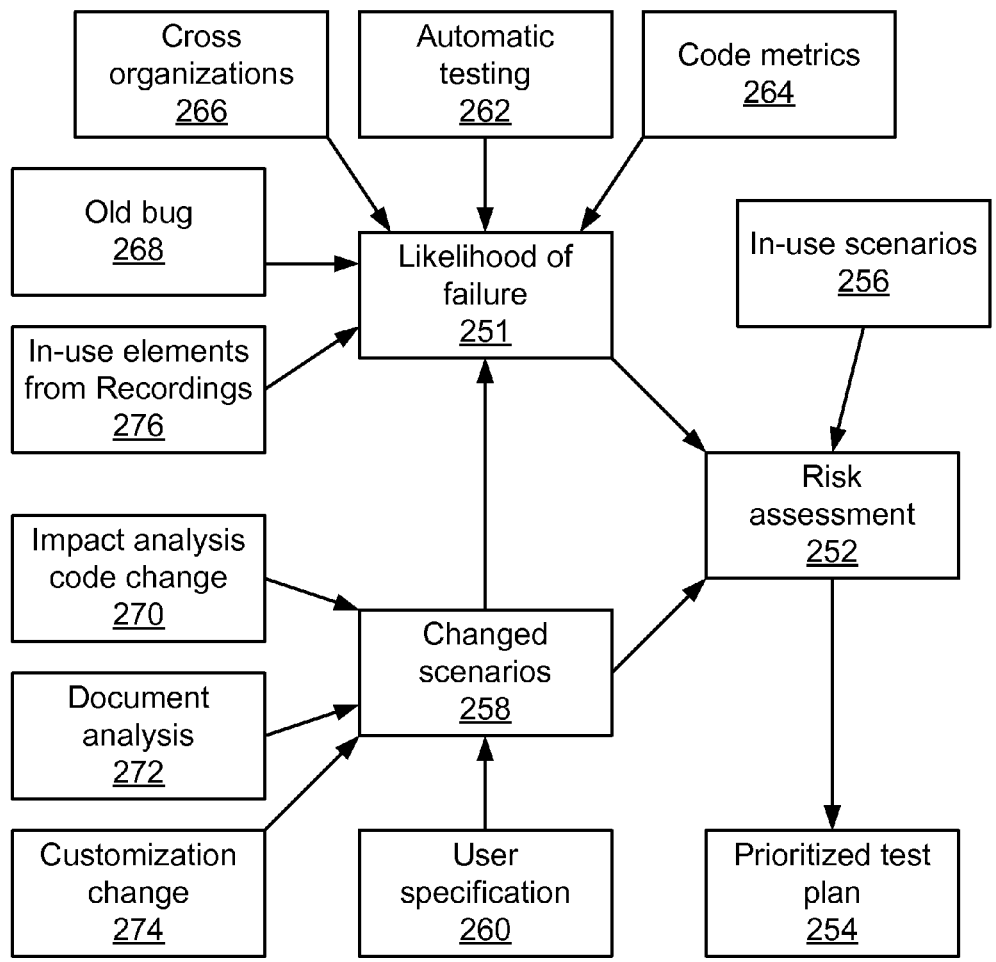
FIG. 14 is a schematic illustration of the likelihood of failure and risk assessment components.

FIG. 14 is a schematic illustration of the likelihood of failure and risk assessment components. Risk assessment 252 receives the in-use scenarios 256, likelihood of failure 251, and user specification 260. The risk assessment 252 is then used for generating the prioritized test plan 254. In-use scenarios 256 describe the scenarios and/or code elements that are actually in-use by the analyzed organization. User specification 260 provides the user preferences for building the test plan, such as ranking of the various operators and ranking the importance of the changed scenarios, and/or gross decisions such as determining that all vanilla code changed by an upgrade process should be checked, or all vanilla code changed by an upgrade process is assumed to operate well. Changed scenarios 258 receive inputs from an impact analysis code change 270, from a document analysis 272, from customization change 274, and from user specification 260.

Likelihood of failure 251 receives the changes scenarios 258, old bugs 268, results from automatic testing 262, in-use elements from recordings 276, code metrics 264, and/or data from cross organizations 266. In one embodiment, the cross organizations 266 provides list of scenarios and their execution results. In one embodiment, the in-use elements from recordings 276 are obtained by dynamic analysis of test scenario recordings that identify the code elements used in the runtime. In one embodiment, results from automatic testing 262 for a portion of the parametric test scenarios may assist in determining the likelihood of failure of the tasks, such as code changes and testing updates, related to the automatically executed parametric test scenarios. For example, failure in executing a parametric test scenario by the automatic testing 262 may increase the likelihood of failure assigned to the other parametric test scenarios related to the same business process, while success in executing a parametric test scenario by the automatic testing 262 may decrease the likelihood of failure assigned to the other parametric test scenarios related to the same business process.

Referring back to FIG. 12, in step 218*r*, based on the previous steps, the test scenarios related to the organization-specific in-use software elements (i.e. the test scenarios that are relevant to the specific organization) are sorted into the following four categories, which are used for generating a task list 130:

(i) Important scenarios that are at high risk to be damaged because of the code change, such as a system upgrade, for which no parametric test scenarios 104 exist. For this group the non-programmer user 100 may be prompted to record parametric test scenarios 104 during upgrade preparations.

(ii) Important scenarios that are at low risk to be damaged because of the upgrade, for which no parametric test scenarios 104 exist. For this group the non-programmer user 100 may be prompted to record the parametric test scenarios 104 during upgrade preparations only when time permits.

In one embodiment, the immediately above categories (i) and (ii) are calculated using the following steps: (a) obtaining the relative complement of the in-use scenarios (from step 210*r*) with respect to the scenarios covered by the available parametric test scenarios (from step 212*r*) on the old installation (referred to as the uncovered scenarios). In other words, obtaining the set of scenarios included in the in-used scenarios 116 and missing from the parametric test scenarios 104; (b) identifying on the new installation the software elements used by the uncovered scenarios (using step 214*r*); then (c) estimating the risks of each uncovered scenario based on summing the products of the software elements it uses on the new installation and their failure probabilities (from step 216*r*). The resulting high-risk scenarios belong to category (i), while the resulting low-risk scenarios belong to category (ii).

(iii) Important scenarios that are at high risk to be damaged because of the upgrade, for which parametric test scenarios 104 do exist. For this group the non-programmer user 100 may be prompted to run the relevant parametric test scenarios 104 during upgrade.

(iv) Important scenarios that are at low risk to be damaged because of the upgrade, for which parametric test scenarios 104 do exist. For this group the non-programmer user 100 may be prompted to run the relevant parametric test scenarios 104 only when time permits.

In one embodiment, the immediately above categories (iii) and (iv) are calculated using the following steps: (a) identifying on the new installation the software elements used by the scenarios covered by the available parametric test scenarios 104 (from step 212*r*); then (b) estimating the risks of each scenario covered by the available parametric test scenarios based on summing the product of the software elements it uses on the new installation and their failure probabilities (from step 216*r*). The resulting high-risk scenarios belong to category (iii), while the resulting low-risk scenarios belong to category (iv).

In some embodiments, steps 210*r* and/or 218*r* are customized according to a required profile.

In one example, step 210*r* is modified to easily set the testing priorities by limiting the first group of in-use scenarios to scenarios used by specific users, specific departments, and/or specific roles in the specific organization. As a numeric example, a finance department has 100 users. 5 managers are identified as most critical to the organization, 10 others are critical, and the rest are important but not critical. Therefore, only the activities of the 5 most critical, or and 15 most critical and critical managers may be logged. Alternatively, the most extensive data logging and performance analysis is applied to the 5 most critical managers, then some less extensive analysis is applied to the 10 critical managers, and the least extensive analysis is applied to the rest of the users. In still another example, it is determined that a first group of department is more important to the organization than a second group of departments. Thus, a most extensive analysis is applied to the activities of the more important departments.

In another example, step 210*r* includes business processes that were previously reported as having bugs by users of the specific organization (may be extracted from a failure reporting logger of the organization), and step 218*r* displays the potentially error-prone software elements versus the upgrade changes. Note that this example customizes the report according to the past bugs in the specific organization, because different organizations usually have different user-generated code, and therefore are susceptible to different bugs.

In another example, step 218*r* is customized by adjusting the organization-specific in-use software elements to include only one or more of the following: actually-in-use software elements, manually identified software elements, software elements related to the business-critical processes, software elements used by specific user/s, software elements used by a specific department, and/or potentially error-prone software elements. In a modification of the last numerical example, steps 210*r* to 216*r* are executed as described. Then, for the purpose of obtaining the relevant tests to be executed, the organization-specific in-use software elements are limited to (i) only the 5 most critical managers, (ii) only software elements associated with senior users in, or the higher the user's location at the organization hierarchical structure—the greater his associated importance weight, and/or (iii) just specific departments. The system then presents the testing categories of step 218*r* according to the 5 most critical managers. In an alternative example, the system presents the testing categories of step 218*r* according to a subset of a predefined business-critical processes (although the information for other less critical processes is available, it is not presented).

Figure 15A:
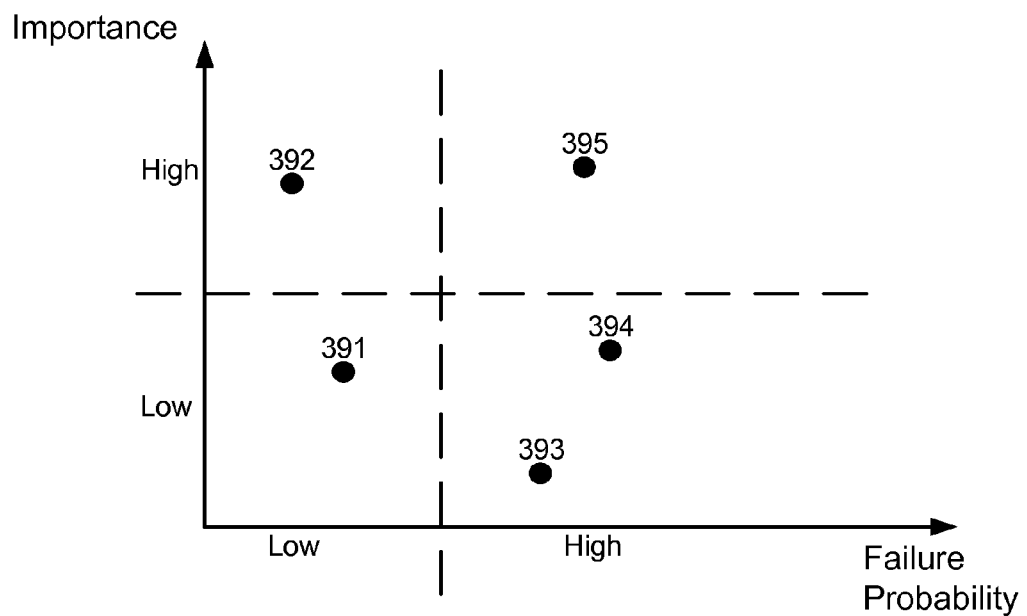
FIG. 15A illustrates one embodiment of displaying test scenarios according to their importance.

FIG. 15A illustrates one embodiment where steps 210*r* and 216*r* are utilized to display the test scenarios according to their importance (extracted from step 210*r*) and failure probability (extracted from step 216*r*). Test scenario 391 features low importance and low failure probability, test scenario 392 features high importance and low failure probability, test scenarios 393 and 394 feature low importance and high failure probability, and test scenario 395 features high importance and high failure probability. The sorting of the illustrated test scenarios may help in prioritizing the test plan.

Figure 15B:
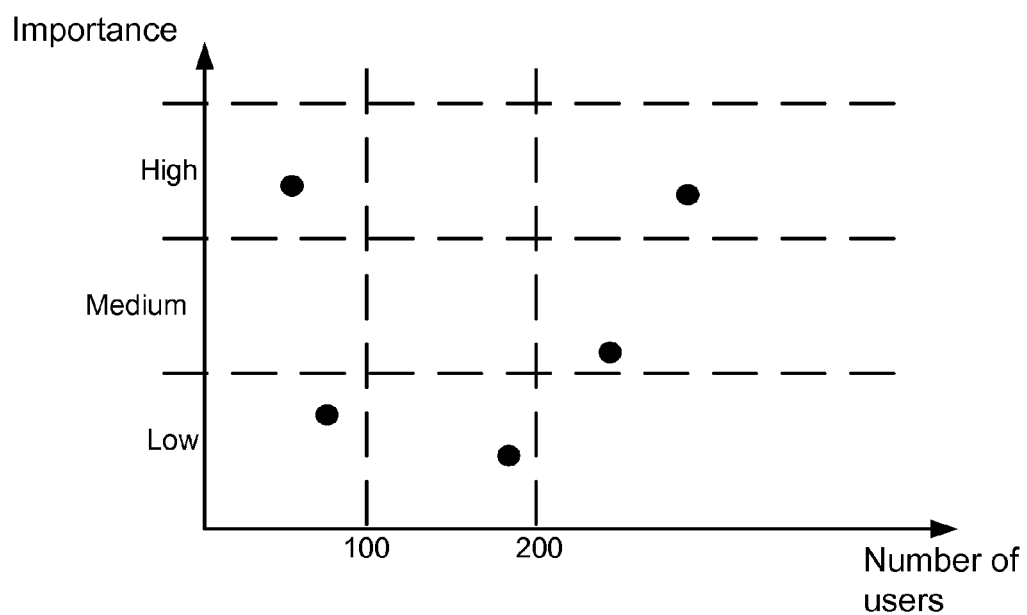
FIG. 15B illustrates one embodiment of displaying test scenarios according to importance versus the number of users.
Figure 15C:
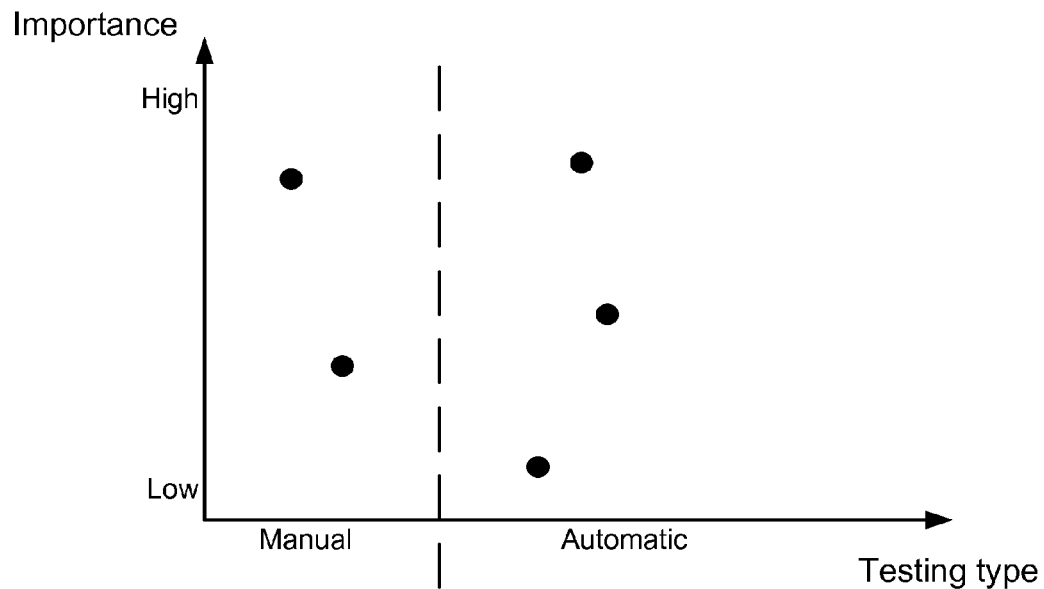
FIG. 15C illustrates one embodiment of displaying test scenarios according to importance versus type of the test scenarios.
Figure 15D:
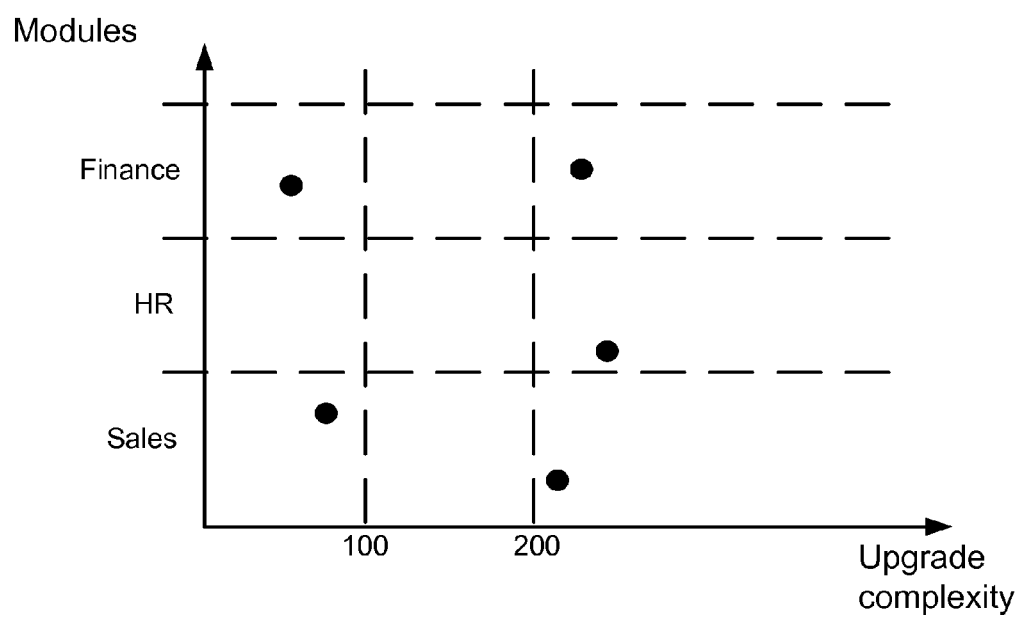
FIG. 15D illustrates one embodiment of displaying test scenarios according to related modules versus estimated upgrade complexity.

The disclosed embodiments may be used for displaying the test scenarios according to various axis, and are not limited in any way to importance versus usability. For example, FIG. 15B illustrates one embodiment where the test scenarios are displayed according to importance of each scenario versus number of users of the scenarios. FIG. 15C illustrates one embodiment where the test scenarios are displayed according to importance of each scenario versus the type of the test scenarios (e.g. manual executed parametric test scenario or automatically executed parametric test scenario). FIG. 15D illustrates one embodiment where the test scenarios are displayed according to the modules to which the test scenarios relate versus the estimated complexity to adapt the various test scenarios to the upgrade.

Cross-Organization Reuse.

In some embodiments, a user belonging to a certain organization accesses a catalog of parametric test scenarios 104, which were created based on data from other organizations. The user automatically or semi automatically adapts the required parametric test scenarios 104 to its specific installation using the following steps: locating the appropriate parametric test scenarios 104 in the catalog; and adapting the parametric test scenarios 104 to the certain organization.

Software as a Service (SaaS) enables easy cross-organization sharing of available tests. In one embodiment, a non-programmer user in one organization records a scenario. Then the scenario is converted to a parametric test scenario 104 and offered to users of other organizations, which may run it on the web without having to install anything. In another embodiment, a user in a certain organization can see a catalog of parametric test scenarios 104 generated from recordings of users in other organizations. The parametric test scenarios 104 are automatically adapted to the specific configuration of the certain organization, although they were recorded on other installations. In still another embodiment, an online parametric test catalog is adapted automatically to a specific organization using the following steps: accessing a parametric test catalog created from recordings of other organizations; and when a user in a certain organization wants to search the catalog for relevant parametric test scenarios 104, the system automatically substitutes suitable values to the parameters according to the needs of the certain organization, so that the non-programmer user 100 will understand what each scenario tests (because it is adapted to his familiar work environment). Optionally, the parametric test scenarios 104 are shown to the non-programmer user 100 according to the old installation, and then automatically updated to the specification of the new installation.

In some embodiments, similar organizations that can potentially exchange data useful for automatic scenario correction and/or automatic code correction share similar usage logging 110, and share similar customizations, such as similar SAP Configuration Tables or similar Oracle Form Personalization.

In one embodiment, a method for reporting failures before execution based on results from an equivalent organization includes the following steps: locating substantially equivalent parametric test scenarios between the current organization and a reference organization that underwent substantially the same software upgrade to a data-oriented large-scale software system; and before executing the substantially equivalent parametric test scenarios on the current organization, reporting expected failures in the substantially equivalent parametric test scenarios, based on the failures observed in the reference organization. Optionally, at least some of the corrections made to fix the substantially equivalent parametric test scenarios on the reference organization are suggested to the current organization. Optionally, more than half of the corrections made to fix the substantially equivalent parametric test scenarios on the reference organization are suggested to the current organization. Optionally, the parametric test scenarios are executed manually, and at least some of the reported expected failures are fixed before executing the substantially equivalent parametric test scenarios on the updated installation of the current organization. Optionally, more than half of the reported expected failures are fixed before executing the substantially equivalent parametric test scenarios on the updated installation of the current organization. Optionally, the substantially equivalent parametric test scenarios call the same Application Program Interface (API). Optionally, the reference organization changed the API in order to adapt for the upgrade, and an equivalent change is suggested to the current organization. Optionally, the substantially equivalent parametric test scenarios refer to batch programs that operate the same vanilla programs.

In one embodiment, a method for reusing code corrections includes the following steps: receiving vanilla software elements and screen flow of a first parametric test scenario executed by a first organization facing an upgrade from a first to a second version of a data-oriented large-scale software system; identifying a second organization that underwent substantially the same upgrade from the first to the second version of the data-oriented large-scale software system, and had a second parametric test scenario that executed substantially the same vanilla software elements and screen flow as the first parametric test scenario; obtaining the results of executing the second parametric test scenario on the second data-oriented large-scale software system of the second organization before adjusting the second parametric test scenario to the upgrade; and estimating, before executing the first parametric test scenario on the second data-oriented large-scale software system of the first organization, whether the first parametric test scenario will succeed or fail based on the obtained results of the second parametric test scenario. Optionally, obtaining the changes made by the second organization to adjust the second parametric test scenario to the upgrade; and suggesting the first organization to implement equivalent changes to adjust the first parametric test scenario to the upgrade. Optionally, implement automatically the equivalent changes to adjust the first parametric test scenario to the upgrade. Optionally, implement the equivalent changes to adjust the first parametric test scenario to the upgrade and then manually executing, on the first time, the first parametric test scenario on the second version of the data-oriented large-scale software system. Optionally, adjusting the second parametric test scenario to the upgrade comprises updating the second parametric test scenario. Optionally, adjusting the second parametric test scenario to the upgrade comprises fixing a user-generated code. Optionally, adjusting the second parametric test scenario to the upgrade comprises reporting a code error in the vanilla software.

In one embodiment, a method for detecting failures without executing parametric test scenarios includes the following steps: maintaining a database describing the results of executing a group of parametric test scenarios on a data-oriented large-scale software system after an upgrade from a first to a second installation, and before adjusting the parametric test scenarios to the upgrade; identifying an organization facing an upgrade from the first to the second installation and having at least one parametric test scenario equivalent to at least one of the parametric test scenarios in the group; and based on the database, estimating results of executing the at least one equivalent parametric test scenario by the organization on the upgraded system, without actually executing the at least one equivalent parametric test scenario. Optionally, based on the database, further suggesting the organization changes to adjust the at least one equivalent parametric test scenario to the upgrade.

In one embodiment, a method for customization sharing based on similar customizations and usage including the following steps: identifying first and second organizations having similar customizations and usage logging 110; obtaining a customization unique to the first organization that is related to an in-use scenario; and suggesting adding the obtained customization to the second organization.

In one embodiment, a method for code sharing based on similar customizations and usage including the following steps: identifying first and second organizations having similar customizations and usage logging 110; obtaining user-generated code unique to the first organization that is related to an in-use scenario; and suggesting adding the obtained user-generated code to the second organization.

In this description, numerous specific details are set forth. However, the embodiments of the invention may be practiced without some of these specific details. In other instances, well-known hardware, software, materials, structures, and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, it is intended to embrace all such alternatives, modifications, and variations that fall within the spirit and scope of the appended claims and their equivalents.

What is claimed is:

1. A non-transitory computer readable medium for use in a computer to process failures of executing test scenarios on a data-oriented large-scale software system, the computer including a processor, and the non-transitory computer readable medium comprising:
   program code for identifying failures of the test scenarios due to logical errors in the failed test scenarios; wherein at least 50% of instructions in the test scenarios are expressed by user interaction activities and not code-related language;
   program code for forwarding the identified logical related failed test scenarios to a non-programmer user for manual evaluation; wherein the manual evaluation comprises manual re-recording of at least one of the logical related failed test scenarios, and wherein the non-programmer user holds a role equivalent to at least one of the following: ERP business analyst, business expert, and end-user;
   program code for identifying a test scenario, from among the logical related failed test scenarios, which failed because of missing prerequisite, and directing the non-programmer user to re-record the test scenario in a way that enables a test recording and analysis component to identify the missing prerequisite;
   program code for identifying failures of the test scenarios due to code errors; and
   program code for forwarding the identified code related failed test scenarios to a programmer for code change.

2. The non-transitory computer readable medium of claim 1, wherein the logical errors result from parametric test scenarios that do not include clear specification of how to handle certain instances of a business process.

3. The non-transitory computer readable medium of claim 1, wherein the logical errors result from missing coverage of all variations of a business process.

4. The non-transitory computer readable medium of claim 1, wherein the logical errors result from inaccurate description of a business process.

5. The non-transitory computer readable medium of claim 1, wherein the code errors cause abnormal termination, and the abnormal termination does not include normal termination with a value different from expected value.

6. The non-transitory computer readable medium of claim 5, wherein the abnormal termination is selected from the group of: internal system errors, activation errors, and compilation errors.

7. The non-transitory computer readable medium of claim 6, wherein the computer runs Java programming language for Enterprise Resource Planning and the internal system errors are Java exceptions.

8. The non-transitory computer readable medium of claim 6, wherein the computer runs Advanced Business Application Programming (ABAP) and the internal system errors are ABAP unexpected errors.

9. A computer system configured to process failures of executing test scenarios on a data-oriented large-scale software system, the computer system comprising:
   a storage device containing computer usable code; and
   a processing unit operable to execute the computer usable code to:
   identify failures of the test scenarios due to logical errors in the failed test scenarios; wherein at least 50% of instructions in the test scenarios are expressed by user interaction activities and not code-related language;

forward the identified logical related failed test scenarios to a non-programmer user for manual evaluation; wherein the manual evaluation comprises manual re-recording of at least one of the logical related failed test scenarios, and wherein the non-programmer user holds a role equivalent to at least one of the following: ERP business analyst, business expert, and end-user;

identify a test scenario, from among the logical related failed test scenarios, which failed because of a missing prerequisite;

direct the non-programmer user to re-record the test scenario in a way that enables a test recording and analysis component to identify the missing prerequisite;

identify failures of the test scenarios due to code errors; and forward the identified code related failed test scenarios to a programmer for code change.

10. The computer system of claim 9, wherein the code errors result in abnormal terminations, and the abnormal terminations do not include normal terminations with values different from expected values.

11. The computer system of claim 9, wherein the code errors result in abnormal terminations, and the abnormal terminations are selected from the group of: internal system errors, activation errors, and compilation errors.

12. The computer system of claim 9, wherein the computer runs Java programming language for Enterprise Resource Planning and the internal system errors are Java exceptions.

13. The computer system of claim 11, wherein the computer runs Advanced Business Application Programming (ABAP) and the internal system errors are ABAP unexpected errors.

14. A computer implemented method for correcting test scenarios using re-recording, comprising:

receiving descriptions of test scenarios that failed while executed by an automatic testing component; wherein at least 50% of instructions in the test scenarios are expressed by user interaction activities and not code-related language;

identifying the test scenarios that failed due to insufficient description while the code is fine;

identifying the test scenarios that failed due to code error;

forwarding to a non-programmer user, for manual re-recording, the test scenarios that failed due to insufficient description while the code is fine;

wherein the non-programmer user holds a role equivalent to at least one of the following: ERP business analyst, business expert, and end-user;

identifying a test scenario, from among the test scenarios that failed due to insufficient description while the code is fine, which failed because of a missing prerequisite, and directing the non-programmer user to re-record the test scenario in a way that enables a test recording and analysis component to identify the missing prerequisite; and forwarding to a programmer, for code change, the test scenarios that failed due to code error.

15. The computer implemented method of claim 14, wherein the step of identifying the test scenarios that failed due to insufficient description is performed by a non-programmer user.

16. The computer implemented method of claim 14, wherein the step of identifying the test scenarios that failed due to code error is performed by a non-programmer user.

17. The computer implemented method of claim 14, wherein a non-programmer user identifies test scenarios that failed with an abnormal termination as test scenarios that failed due to code error, wherein abnormal termination does not include normal termination with a value different from an expected value.

18. The computer implemented method of claim 14, wherein a non-programmer user identifies test scenarios that do not result in predefined expected values as test scenarios that were failed due to insufficient description while the code is fine.

* * * * *